(12) United States Patent
Nishibata

(10) Patent No.: US 11,973,368 B2
(45) Date of Patent: Apr. 30, 2024

(54) CONTROL APPARATUS OF POWER CONVERTER

(71) Applicant: DENSO CORPORATION, Kariya (JP)

(72) Inventor: Kouichi Nishibata, Kariya (JP)

(73) Assignee: DENSO CORPORATION, Kariya (JP)

( * ) Notice: Subject to any disclaimer, the term of this patent is extended or adjusted under 35 U.S.C. 154(b) by 85 days.

(21) Appl. No.: 17/886,168

(22) Filed: Aug. 11, 2022

(65) Prior Publication Data

US 2022/0393504 A1 Dec. 8, 2022

Related U.S. Application Data

(63) Continuation of application No. PCT/JP2021/003038, filed on Jan. 28, 2021.

(30) Foreign Application Priority Data

Feb. 13, 2020 (JP) .................. 2020-022524

(51) Int. Cl.
*H02J 9/06* (2006.01)
*H02M 7/5387* (2007.01)
*H02P 27/06* (2006.01)
*H02P 29/024* (2016.01)

(52) U.S. Cl.
CPC ......... *H02J 9/062* (2013.01); *H02M 7/53871* (2013.01); *H02P 27/06* (2013.01); *H02P 29/024* (2013.01)

(58) Field of Classification Search
CPC .................................................. H02J 9/062

USPC .......................................................... 307/64
See application file for complete search history.

(56) References Cited

U.S. PATENT DOCUMENTS

| | | | |
|---|---|---|---|
| 2012/0050922 A1* | 3/2012 | Yamai | H02P 29/032 361/31 |
| 2013/0033908 A1 | 2/2013 | Schwarz et al. | |
| 2016/0134212 A1* | 5/2016 | Kikuchi | H02P 27/06 318/400.21 |
| 2018/0178833 A1* | 6/2018 | Terdy | H02H 7/1227 |
| 2018/0331616 A1 | 11/2018 | Hirakata et al. | |
| 2019/0341871 A1 | 11/2019 | Nishibata | |

FOREIGN PATENT DOCUMENTS

| | | |
|---|---|---|
| JP | 2014-183702 A | 9/2014 |
| JP | 2017-208911 A | 11/2017 |

* cited by examiner

*Primary Examiner* — Joseph Chang
(74) *Attorney, Agent, or Firm* — Oliff PLC

(57) ABSTRACT

The control circuit for a system provided with a power converter of multi-phase rotating electric machine, and is provided with a switch driving unit that drives the upper and lower arm switches based on the switching command to drive the rotating electric machine, an emergency power source that generates power with a power supplied from the power storage unit, an abnormality determination unit that determines whether a failure occurs in the control circuit, and an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source.

9 Claims, 14 Drawing Sheets

CONTROL APPARATUS OF POWER CONVERTER

CROSS-REFERENCE OF RELATED APPLICATION

This application is the U.S. bypass application of International Application No. PCT/JP2021/003038 filed on Jan. 28, 2021, which designated the U.S. and claims priority to Japanese Application No. 2020-022524, filed Feb. 13, 2020, the contents of these are incorporated herein by reference.

BACKGROUND

Technical Field

The present disclosure relates to a control circuit of a power converter having upper and lower arm switches electrically connected to respective phase windings of a rotating electric machine.

Description of the Related Art

For this type of control circuit, a control circuit that performs a shutdown control in which the upper and lower arm switches are forcibly turned OFF when a failure is detected in the rotating electric machine or the like is provided. In the case where the shutdown control is performed, if a reverse voltage has occurred on a winding due to the rotation of the rotor that constitutes the rotating electric machine, a line voltage of the winding is sometimes higher than the voltage of a storage unit connected in parallel to the series-connected body of the upper and lower arm switches. A state where the line voltage becomes higher possibly occurs, for example, when an amount of the field magnetic flux of the rotor is large or a rotation speed of the rotor is high.

SUMMARY

The present disclosure provides a control circuit of a power converter for a system provided with a power storage unit, a multiphase rotating electric machine, and a power converter having upper arm switches and lower arm switches electrically connected to respective phases of the rotating electric machine, the control circuit includes: a switch command generation unit that generates a switching command for performing a drive control of the rotating electric machine; a switch driving unit that drives the upper and lower arm switches based on the switching command, the switch driving unit being capable of operating with power supplied thereto; an emergency power source that generates an emergency power, the emergency power source being supplied with power from the power storage unit; an abnormality determination unit that determines whether a failure occurs in the control circuit; and an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source.

BRIEF DESCRIPTION OF THE DRAWINGS

The above-described objects and other objects, features and advantages of the present disclosure will be clarified further by the following detailed description with reference to the accompanying drawings. The drawings are.

DETAILED DESCRIPTION OF THE PREFERRED EMBODIMENTS

Figure 1:
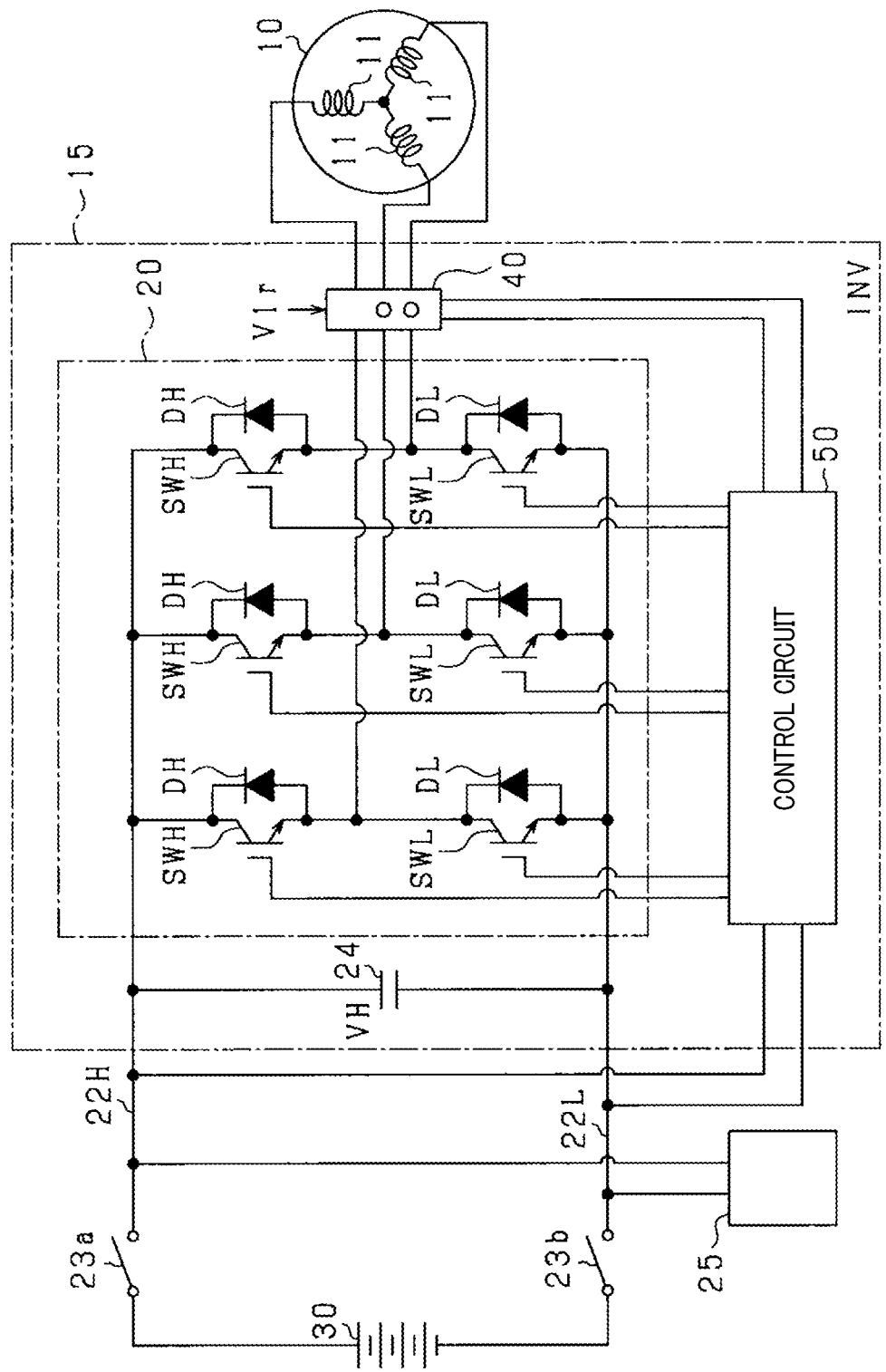
FIG. 1 is a diagram showing an overall configuration of a control system according to a first embodiment.

As an example, a control circuit that performs a shutdown control in which the upper and lower arm switches are forcibly turned OFF when a failure is detected in the rotating electric machine or the like is provided. In the case where the shutdown control is performed, if a reverse voltage has occurred on a winding due to the rotation of the rotor that constitutes the rotating electric machine, a line voltage of the winding is sometimes higher than the voltage of a storage unit connected in parallel to the series-connected body of the upper and lower arm switches. A state where the line voltage becomes higher possibly occurs, for example, when an amount of the field magnetic flux of the rotor is large or a rotation speed of the rotor is high.

In the case where the line voltage of the winding is higher than the voltage of the power storage unit, even when the shutdown control is performed, so-called regeneration is performed where induced current occurred in the winding flows through a closed circuit including diodes connected in reverse to the switches, the windings and power storage unit. As a result, the DC voltage in the power storage unit side of the power converter significantly increases and may cause a failure on at least one apparatus among the power storage unit, the power converter and apparatuses other than the power converter connected to the power storage unit.

In order to deal with such a problem, as disclosed in a patent literature JP-T-2013-506390, a control circuit that performs a short circuit control is known. The control circuit controls either the upper arm switch or the lower arm switch to be turned ON and the other arm switch to be turned OFF. Specifically, the control circuit is capable of operating when a power supply unit supplies power to the control circuit. The control circuit includes an output-stage drive control unit. The output-stage drive control unit performs the above-mentioned short circuit control. Preparing for a case where a failure occurs on the power supply unit, the control unit is provided with a configuration capable pf supplying power of the power supply source which does not depend on the power supply unit. According to this configuration, even when a failure occurs on the power supply unit, the short circuit control can be performed.

Even in the case where no failure has occurred in the power supply unit, a failure possibly occurs in the control circuit. When such a failure occurs, the control circuit stops the control and causes a shutdown state in which the upper and lower arm switches are turned OFF. Hence, short circuit control cannot be performed.

Hereinafter embodiments of the present disclosure will be described with reference to the drawings.

First Embodiment

Hereinafter, with reference to the drawings, a first embodiment in which a control circuit of the present disclosure is embodied will be described. The control circuit of the present embodiment is applied to a three-phase inverter as a power converter. In the present embodiment, a control system provided with an inverter is mounted on a vehicle such as an electric vehicle or a hybrid-vehicle.

As shown in FIG. 1, the control system is provided with a rotating electric machine 10 and an inverter 15. The rotating electric machine serves as a main motor and is configured to transfer power from the rotor thereof to the driving wheels (not shown). According to the present embodiment, as the rotating electric machine 10, a synchronous motor, that is, a permanent magnet type synchronous motor is employed.

The inverter 15 is provided with a switching device unit 20. The switching device unit 20 includes a series-connected body composed of an upper arm switch SWH and a lower arm switch corresponding to each of three phases. In each phase, a first end of a winding 11 of the rotating electric machine 10 is connected to a connection point between the upper and lower am switches SWH and SWL. The second ends of respective windings 11 are connected at the neutral point. The respective windings 11 are arranged to be shifted by 120° of electrical angle. Note that, according to the present embodiment, a voltage control type semiconductor switching elements is used for each of switches SWH and SWL, specifically, IGBT is used. An upper arm diode DH and a lower arm diode DL as free-wheel diodes are reverse-connected to the upper arm switch SWH and the lower arm switch SWL, respectively.

The positive terminal of a high voltage power source 30 is connected to collectors as the high voltage side terminals of respective upper arm switches SWH via a high voltage side conduction path 22H. The negative terminal of the high voltage power source 30 is connected to emitters as the low voltage side terminals of respective lower arm switches SWL via a low voltage side conduction path 22L. According to the present embodiment, the high voltage power source 30 is a secondary battery, of which the output voltage (rated voltage) is, for example, a hundred volts or larger.

In the high voltage side conduction path 22H, a first cutoff switch 23a is disposed, and in the low voltage side conduction path 22L, a second cutoff switch 23b is disposed. The switches 23a and 23b are each configured as a relay or a semiconductor switch. The switches 23a and 23b may be driven by a control circuit 50 or may be driven by a upper level control device relative to the control circuit 40.

The inverter 15 is provided with a smoothing capacitor 24 as a power storage unit. The smoothing capacitor 24 electrically connects a portion closer to the switching device unit 20 than a portion of the first cutoff switch 23a in the high voltage side conduction path 22H and a portion closer to the switching device unit 20 than a portion of the second cutoff switch 23b in the low voltage side conduction path 22H.

The control system is provided with an on-vehicle electrical equipment 25. The electrical equipment 25 includes at least either an electrical compressor or a DC-DC converter. The electrical compressor configures an in-vehicle cabin air conditioning apparatus, being supplied with power from the high voltage power source 30 and driven to circulate the coolant in the on-vehicle refrigerating cycle. The DC-DC converter step-downs the output voltage of the high voltage power source 30 and supplies the step-downed voltage to an on-vehicle low voltage load. According to the present embodiment, a low voltage power source 31 is configured as a secondary battery of which the output voltage (rated voltage) is lower than the output voltage (rated voltage) of the high voltage power source 30, for example, configured as a lead-acid battery.

Figure 2:
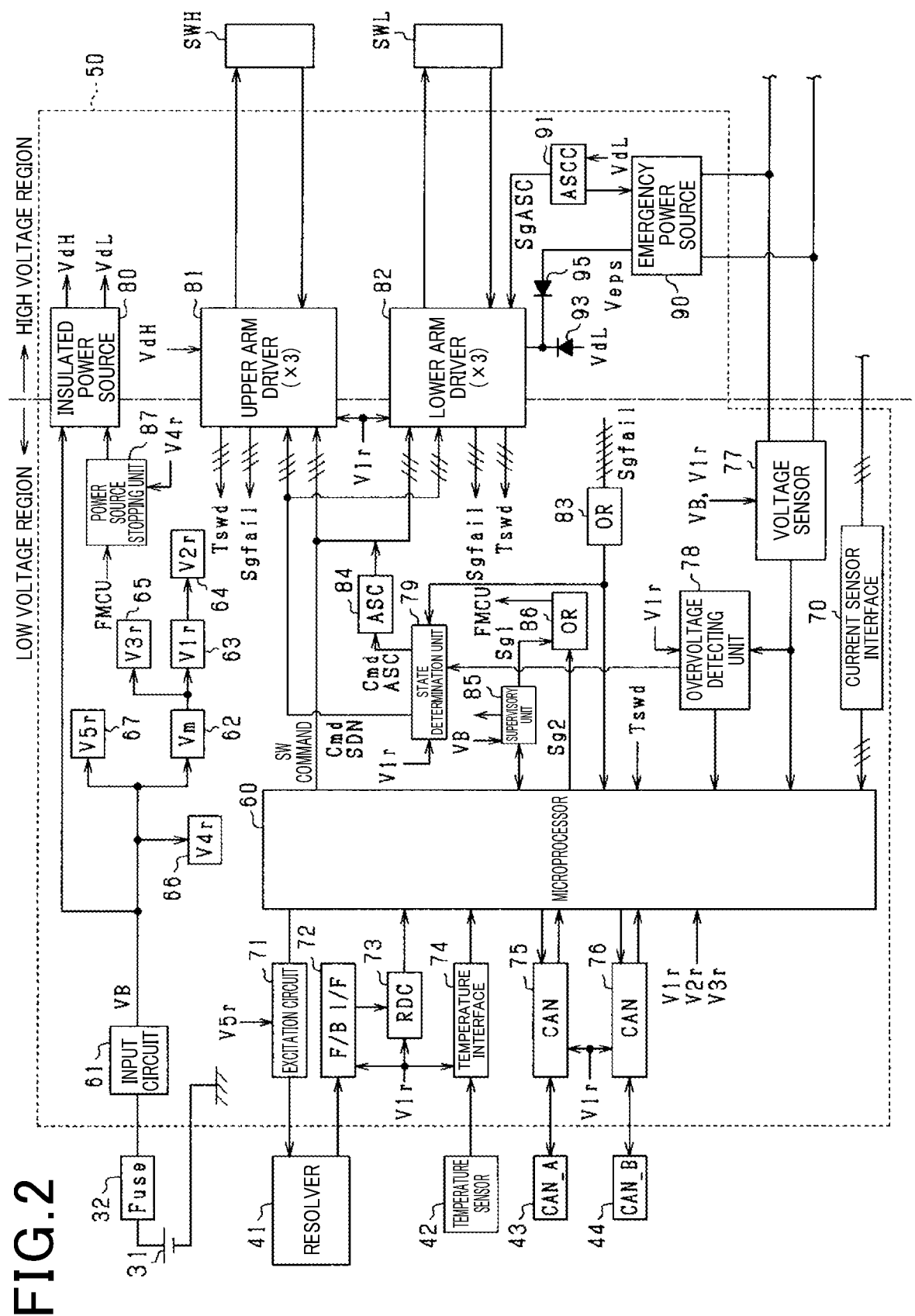
FIG. 2 is a diagram showing a control circuit and its peripheral configuration.

As shown in FIGS. 1 and 2, the control system is provided with a phase current sensor 40, an angle sensor 41 and a temperature sensor 42. The phase current sensor 40 outputs current signal depending on current for two phases among respective current flowing through the rotating electric machine 10. The angle sensor 41 outputs an angle signal depending on an electrical angle of the rotating electric machine 41. The angle sensor 41 is configured of a MR sensor having a resolver, an encoder or a magneto-resistive sensor. According to the present embodiment, the angle sensor 41 is configured of a resolver. The temperature sensor 42 outputs a temperature signal depending on a temperature of components of the control system such as components that constitute the rotating electric machine 10.

With reference to FIG. 2, a configuration of a control circuit 50 will be described. The control circuit 50 is provided with an input circuit 61, an intermediate power source circuit 62 and first to fifth low voltage power source circuit 63 to 67. The positive terminal of the low voltage power source 31 is connected to the input circuit 61 via the fuse 32. The negative terminal of the low voltage power source 31 is connected to the ground as a grounding portion.

The intermediate power source circuit 62 steps down the output voltage VB of the input circuit 61 to generate an intermediate voltage Vm (e.g. 6V). The first low voltage power source circuit 63 steps down the output voltage Vm of the intermediate power source circuit 62 to generate a first voltage V1r (e.g. 5V). The second low voltage power source circuit 64 steps down the first voltage V1r outputted by the first low voltage power source circuit 63 to generate a second voltage V2r (e.g. 3.3V). The third low voltage power source circuit 65 steps down the first voltage V1r outputted by the first low voltage power source circuit 63 to generate a third voltage V3r. According to the present embodiment, the third voltage V3r is a voltage (e.g. 1.2V) lower than the second voltage V2r.

The fourth low voltage power source circuit 66 steps down the output voltage VB of the input circuit 61 to generate a fourth voltage V4r (e.g. 5V). According to the present embodiment, the fourth voltage V4r has the same value as that of the first voltage V1r. The fifth low voltage power source circuit 67 boosts the output voltage VB of the input circuit 61 to generate a fifth voltage V5r (e.g. 30V).

The input voltage 61, respective power source circuits 62 to 67 and a microprocessor 60 are provided in a lower voltage region of the control circuit 50. According to the present embodiment, the first to third low voltage power source circuits 63 to 65 correspond to first power source circuit and the fourth low voltage power source circuit 66 correspond to second power source circuit.

The first voltage V1r of the first low voltage power source circuit 63 is supplied to the phase current sensor 40. Thus, the phase current sensor 40 is capable of outputting a current signal depending on an amount of the phase current. The current signal is transmitted to the microprocessor 60 via a current interface 70 included in the control circuit 50. The microprocessor 60 calculates the amount of the phase current based on the transmitted current signal.

The control circuit 50 is provided with an excitation circuit 71, a FB interface 72 and a resolver digital converter 73. The excitation circuit 71 is configured to operate by being supplied with the fifth voltage V5r of the fifth low voltage power source circuit 67. The excitation circuit 71 supplies sinusoidal excitation signal to a resolver stator that constitutes the angle sensor 41. The angle signal outputted by the resolver stator is transmitted to the resolver digital converter 73 via the FB interface 72. The FB interface 72 and the resolver digital converter 73 are configured to operate by being supplied with the first voltage V1r of the first low voltage power source circuit 63. The resolver digital converter 73 calculates an electrical angle of the rotating electric machine based on the angle signal transmitted from the FB interface 72. The calculated electrical angle is transmitted to the microprocessor 60. The microprocessor 60 calculates the electrical angular velocity of the rotating electric machine 10 based on the transmitted electrical angle.

The control circuit 50 is provided with a temperature interface 74. The temperature signal outputted by the temperature sensor 42 is transmitted to the microprocessor 60 via the temperature interface 74. The temperature interface 74 is configured to operate by being supplied with the first voltage V1r of the first low voltage power source circuit. The microprocessor 60 calculates the temperature of an object to be detected by the temperature sensor 42 based on the transmitted temperature signal.

The control circuit 50 is provided with a first and second transceiver 75 and 76. The first and second transceiver 75 and 76 are configured to operate by being supplied with the first voltage V1r of the first low voltage power source 63. The microprocessor 60 exchange information through the first and second CAN transceiver 75 and 76 and the first and second CAN bus 43 and 44.

Note that, the current interface 70, the excitation circuit 71, the FB interface 72, the resolver digital converter 73, the temperature interface 74 and the first and second CAN transceiver 75 and 76 are provided in a lower voltage region of the control circuit 50.

The microprocessor 60 is provided with a CPU and peripheral circuit thereof. The peripheral circuit includes an input-output unit for exchanging information with outside devices and an AD converter. For the microprocessor 60, the first voltage V1r of the first low voltage power source circuit 63, the second voltage V2r of the second low voltage power source circuit 64 and the third voltage V3r of the third low voltage source circuit 65.

The control circuit 50 is provided with a voltage sensor 77, an overvoltage detection unit 78 and a state determination unit 79. The voltage sensor 77 is electrically connected to the high voltage side conduction path 22H and the low voltage side conduction path 22L and configured to operate by being supplied with the output voltage VB of the input circuit 61, the fifth voltage V5r of the fifth low voltage source circuit 67. The voltage sensor 77 outputs a voltage signal depending on the terminal voltage of the smoothing capacitor 24. The voltage signal outputted by the voltage sensor 77 is transmitted to the microprocessor 60 and the overvoltage detection unit 78.

The overvoltage detection unit 78 is configured to operate by being supplied with the first voltage V1r of the first low voltage power source circuit 63. The overvoltage detection unit 78 determines whether the terminal voltage of the smoothing capacitor 24 calculated based on the transmitted voltage signal exceeds the upper limit voltage. The overvoltage detection unit 78, when determining that the terminal voltage exceeds the upper limit voltage, outputs an overvoltage signal to the microprocessor 60 and the state determination unit 79.

The state determination unit 79 is configured to operate by being supplied with the first voltage V1r of the first low voltage power source circuit 63. Further, according to the present embodiment, the state determination unit 79 is configured of a logic circuit. The voltage sensor 77, the overvoltage detection unit 78 and the state determination unit 79 are provided in the lower voltage region of the control circuit 50.

The microprocessor 60 generates a switching command for respective switches SWH and SWL of the switching device unit 20 so as to control the controlled variable of the rotating electric machine 10 to be the command value. The controlled variable is, for example, a torque. The microprocessor 60 generates a switching command based on the respective sensors 40 to 42 and 77. The microprocessor 60 generates the switching command in the respective phases to control the upper arm switch SWH and the lower arm switch SWL to be alternately ON and OFF. According to the present embodiment, the microprocessor 60 includes a switch command generation unit.

The control circuit 50 is provided with an insulation power source 80, an upper arm driver 81 and a lower arm driver 82. According to the present embodiment, the upper arm driver 81 is provided for each of the upper arm switches SWH, and the lower arm driver 82 is provided for each of the lower arm switches SWL. Hence, the number of drivers 81 and 82 is 6.

The insulated power source 80 generates, based on the voltage supplied from the input circuit 61, an upper arm drive voltage VdH to be supplied to the upper arm driver 81 and the lower arm drive voltage VdL to be supplied to the lower arm driver 82 and outputs them. The insulated power source 80, the respective drivers 81 and 82 are provided in the lower voltage region and the higher voltage region to be positioned across the boundary portion therebetween. Specifically, the insulated power source 80 is provided with upper arm insulated power sources provided respective three phase upper arm drivers 81 and a lower arm insulated power source which is shared by three phase lower arm drivers 82. According to the present embodiment, respective upper arm insulated power source and the lower arm insulated power source are controlled by common power source control unit.

Note that the lower arm insulated power source may be provided corresponding to each of the three phase lower arm drivers 82 individually.

Subsequently, with reference to FIG. 3, the upper and lower arm drivers 81 and 82 will be described.

The upper arm driver 81 is provided with an upper arm driving unit 81a and an upper arm insulation interface 81b as switch driving unit. The upper arm driving unit 81a is disposed in the higher voltage region. The upper arm interface unit 81b is provided in the lower voltage region and the higher voltage region to be positioned across the boundary portion therebetween. The upper arm insulation interface 81b electrically insulates between the lower voltage region and the higher voltage region and transmits a switching command outputted from the microprocessor 60 to the upper arm driving unit 81a. The upper arm insulation interface 81b is, for example, a photo-coupler or a magnetic coupler.

In the upper arm driver 81, the upper arm driving unit 81a, configuration of the upper arm insulation interface 81b in the higher voltage region side are configured to operate by being supplied with the upper arm drive voltage VdH of the insulated power source 80. Moreover, in the upper arm driver 81, the upper arm insulation interface 81b in the lower voltage region is configured to operate by being supplied with the first voltage V1r of the first low voltage power source circuit 63.

The upper arm driving unit 81a supplies a charger current to the gate of the upper arm switch SWH when the switching command transmitted to the upper arm driving unit 81a is ON command. Thus, the gate voltage of the upper arm switch SWH becomes the threshold voltage Vth, and the upper arm switch SWH is turned ON. On the other hand, the upper arm driving unit 81a makes the discharge current flow from the gate of the upper arm switch SWH to the emitter side. Thus, the gate voltage of the upper arm switch SWH becomes less than the threshold Vth, and the upper arm switch SWH is turned OFF.

The upper arm driving unit 81a transmits a fail signal Sgfail indicating information that a failure occurs on the upper arm switch SWH and information of the temperature Tswd of the upper arm switch SWH to the microprocessor 60 via the upper arm insulation interface 81b. Note that the failure of the upper arm switch SWH includes at least one of an over heat failure, an over voltage failure and an over current failure.

The lower arm driver 82 is provided with a lower arm driving unit 82a and a lower arm insulation interface 82b as switch driving unit. In the present embodiment, the configurations of the respective drivers 81 and 82 are the same. Hence, detailed explanation for the lower arm driver 82 will be omitted.

In the lower arm driver 82, the lower arm driving unit 82a, configuration of the lower arm insulation interface 82b in the higher voltage region side are configured to operate by being supplied with the lower arm drive voltage VdL of the insulated power source 80. Moreover, in the lower arm driver 82, configuration of the lower arm insulation interface 82b in the lower voltage region is configured to operate by being supplied with the first voltage V1r of the first low voltage power source circuit 63.

The lower arm driving unit 82a supplies the charge current to the gate of the lower arm switch SWL when the transmitted switching command is ON command. Thus, the gate voltage of the lower arm switch SWL is higher than or equal to the threshold voltage Vth, and the lower arm switch SWL is turned ON. On the other hand, the lower arm driving unit 82a makes the discharge current flow from the gate of the lower arm switch SWL to the emitter side. Thus, the gate voltage of the lower arm switch SWL is less than the threshold voltage Vth, and the lower arm switch SWL is turned OFF.

The lower arm driving unit 82a transmits a fail signal Sgfail indicating information that a failure occurs on the lower arm switch SWL and information of the temperature Tswd of the lower arm switch SWL to the microprocessor 60 via the lower arm insulation interface 82b. Note that the failure of the lower arm switch SWL includes at least one of an overheat failure, an over voltage failure and an over current failure. Referring back to FIG. 2, the control circuit 50 is provided with a failure detection unit 83. The failure detection unit 83 is disposed in the lower voltage region and configured to accept the fail signal Sgfail from respective drivers 81 and 82. The failure detection unit 83 outputs, when accepting the failure signal from either the driver 81 or the driver 82, an abnormality signal to the microprocessor 60 and the state determination unit 79.

The control circuit 50 is provided with a low voltage side ASC command unit 84, a supervisory unit 85, an OR circuit 86 and a power source stopping unit 87 as an abnormality determination unit. The low voltage side ASC command unit 84, the supervisory unit 85, the OR circuit 86 and the power source stopping unit 87 as emergency determination unit are provided in the lower voltage region. The supervisory unit 85 is configured to operate by being supplied with the output voltage VB of the input circuit 61. The power source stopping unit 87 is configured to operate by being supplied with the fourth voltage V4r of the fourth low voltage power source circuit 66.

The low voltage side ASC command unit 84 forcibly changes, when the low voltage side ASC command CmdASC is transmitted from the state detection unit 79, the switching command transmitted to the three phase lower arm drivers 82 to be ON command regardless of the switching command outputted from the microprocessor 60.

Figure 3:
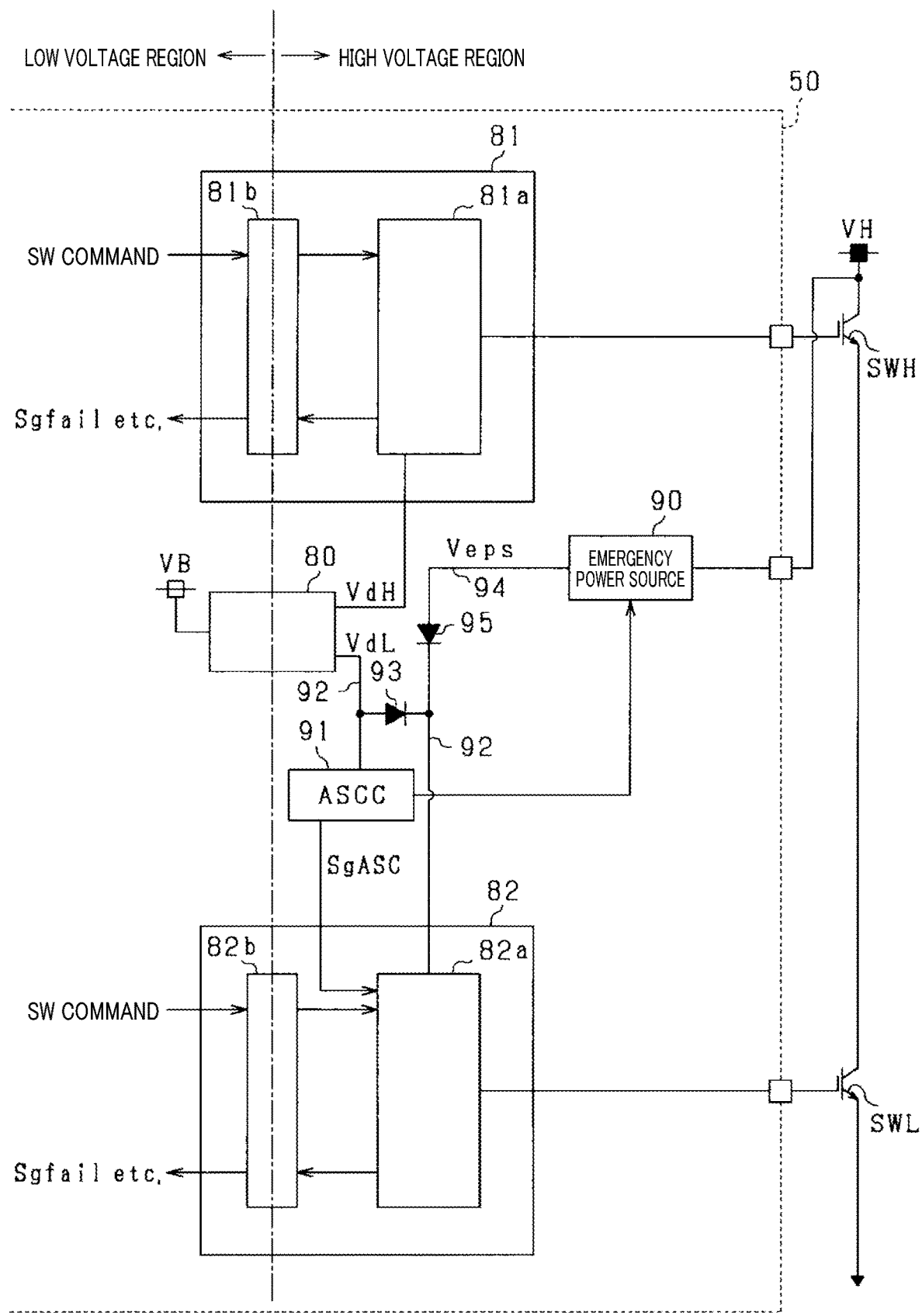
FIG. 3 is a diagram showing upper and lower arm drivers and their peripheral configuration.

With reference to FIGS. 2 and 3, a configuration of the higher voltage region in the control circuit 50 will be described.

The control circuit 50 is provided with an emergency power source 90 and a high voltage side ASC command unit 91 as emergency control unit. The emergency power source 90 is supplied with the output voltage of the smoothing capacitor 24, thereby generating an emergency drive voltage Veps. As the emergency power source 90, various power sources can be utilized. For example, a switching power source can be utilized. The high voltage side of the smoothing capacitor 24 is connected to the input side of the emergency power source 90. An emergency drive voltage Veps outputted from the output side of the emergency power source 90 is controlled to be the target voltage thereof.

The control circuit 50 is provided with a normal-use power source path 92, a normal-use diode 93, an emergency power source path 94 and an emergency diode 95. The normal-use power source path 92 connects the output side of the insulated power source 80 and the lower arm driving unit 82a, to supply the lower arm driving voltage VdL to the lower arm driving unit 82a. The normal-use diode 93 is disposed at an intermediate position of the normal-use power source path 92 in a state where the anode thereof is connected to the output side of the insulated power source 80.

A lower arm driving unit 82a side relative to the normal-use diode 93 in the normal-use power source path 92 is connected to the output side of the emergency power source 90 via the emergency power source path 94. The emergency diode 95 is provided in the emergency power source path 94 in a state where the anode thereof is connected to the output side of the emergency power source 90. The emergency power source path 94 is used to supply an emergency drive voltage Veps to the lower arm driving unit 82a.

The high voltage side ASC command unit 91 is configured to be supplied with the lower arm driving voltage VdL of the insulated power source 80 via the normal-use power source path 92. The high voltage side ASC command unit 91 outputs the high voltage side ASC command SgASC to the lower arm driving unit 82a.

Subsequently, with reference to FIG. 4, the OR circuit 86, the power source stopping unit 87 and peripheral configuration thereof will be described. The OR circuit 86 is provided with first to fourth resistors 86a to 86d and first and second switches 86e and 86f. The microprocessor 60 and the first end of the second resistor 86b are connected to the first end of the first resistor 86a. The second end of the second resistor 86b is connected to the ground. The second end of the first resistor 86a is connected to the supervisory unit 85 via the third resistor 86c.

The first end of the fourth resistor 86d is connected to the fourth low voltage power source circuit 66 and the second end of the fourth resistor 86d is connected to the ground via the first switch 86d. A first determination signal Sg1 from the supervisory unit 85 is applied to the gate of the first switch 86e. The second end of the first resistor 86a is connected to the ground via the second switch 86f. The base of the second switch 86f is connected to the connection point between the fourth resistor 86f and the first switch 86e.

The microprocessor 60 includes a self-monitoring function. Specifically, the microprocessor 60, when determined that no failure occurs on the microprocessor 60 itself, changes the logical state of the second determination signal Sg2 to be H. In this case, the logical state of a failure notification signal FMCU as an output signal of the OR circuit becomes H. On the other hand, the microprocessor 60, when determined that failure occurs on the microprocessor 60 itself, changes the logical state of the second determination signal Sg2 to be L. In this case, the logical state of the failure notification signal FMCU becomes L.

The supervisory unit 85 includes a function of supervising whether a failure occurs on the microprocessor 60, and is configured as, for example, a watchdog counter (WDC) or a function watchdog counter (F-WDC). The supervisory unit 85 changes the logical state of the first determination signal Sg1 to be L when determined that no failure occurs on the microprocessor 60. In this case, the first and second switches 86e and 86f are maintained at OFF state, and the logical state of the failure notification signal FMCU becomes H. On the other hand, the supervisory unit 85 changes the logical state of the first determination signal Sg1 to be H when determined that a failure occurs on the microprocessor 60. In this case, the first and second switches 86e and 86f are turned to be ON and the logical state of the failure notification signal FMCU is changed to be L.

The failure notification signal FMCU is transmitted to the power source stopping unit 87. The power source stopping unit 87 is provided with a failure detecting circuit 87a and a changeover switch 87b. The first end of the changeover switch 87b is connected to the ground and the second end of the changeover switch 87b is connected to a connection point between the first and second voltage dividers 96a and 96b included in the control circuit 50. The first end of the series-connected body of the first and second voltage divider 96a and 96b is connected to the input circuit 61, and the second end of the series-connected body of the first and second voltage divider 96a and 96b is connected to the ground. The connection point between the first and second voltage dividers 96a and 96b is connected to the UVLO terminal of the insulated power source 80. The control unit of the insulated power source 80 performs, when determined that the determination voltage Vjin transmitted to the connection point is lower than the low voltage threshold VUVLO, a low-voltage malfunction prevention process that stops the insulated power source 80. On the other hand, the control unit of the insulated power source 80, when determined that the transmitted determination voltage Vjin exceeds a release threshold (<VB) which is higher than the low voltage threshold VUVLO, stops the low-voltage malfunction prevention process and restarts the operation of the insulated power source 80.

The failure detecting circuit 87a is configured to operate by being supplied with the fourth voltage V4r of the fourth low voltage power source circuit 66. The failure detecting circuit 87a turns the changeover switch 87b OFF when determined that the logical state of the failure notification signal FMCU is H. In this case, the determination voltage Vjin is larger than or equal to the low voltage threshold VUVLO. On the other hand, the failure detecting circuit 87a turns the changeover switch 87b ON when determined that the logical state of the failure notification signal FMCU is L. In this case, the determination voltage Vjin is lower than the low voltage threshold VUVLO, and the low-voltage malfunction prevention process is executed. When this process is executed, the insulated power source 80 is stopped and the upper arm drive voltage VdH and the lower arm drive voltage VdL gradually decrease to 0V.

According to the present embodiment, conventionally, in the case where a failure occurs in the control circuit 50 that causes a shutdown state, a three-phase short circuit control (ASC: active short circuit) can be performed. Note that, the failure in the control circuit 50 includes a failure of the microprocessor 60, a failure in the intermediate power source circuit 62, at least one failure in the first to third low voltage power source circuits 63 to 65, a failure in which a switching command is unable to transmit to the upper and lower arm drivers 81 and 82 from the microprocessor 60, and a failure in which voltage cannot be outputted from the insulated power source 80. A failure in which voltage cannot be outputted from the insulated power source 80 includes a failure of the insulated power source 80, and a failure in which power cannot be supplied to the insulated power source 80 from the low voltage power source 31. Note that, the failure in which power cannot be supplied to the insulated power source 80 from the low voltage power source 31 is a case where a breakage occurs on the electrical path from the low voltage power source 31 to the insulated power source 80, for example, the input circuit 61. For a case of the lower arm driver 82, a failure in which the switch command is unable to transmit includes a failure in which a breakage occurs on the signal path from the microprocessor 60 to the lower arm insulation interface 82b. Note that the above-described failures may be caused when collision occurs between vehicles, for example.

Figure 5:
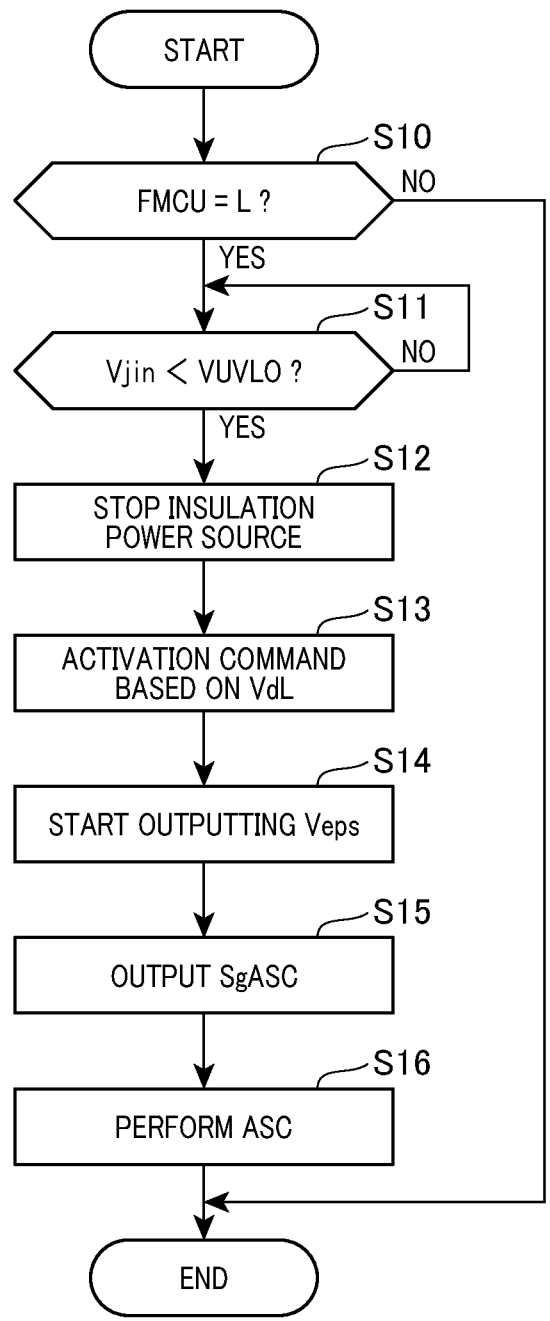
FIG. 5 is a flowchart showing a procedure of three-phase short-circuit control performed in response to a high voltage side ASC command.

With reference to FIG. 5, three-phase short-circuit control executed when a failure occurs in the control circuit 50 will be described.

At step S10, the failure detecting circuit 87a of the power source stopping unit 87 determines whether the logical state of the failure notification signal FMCU is L. When the logical state of the second determination signal Sg2 outputted from the microprocessor is L, or the logical state of the first determination signal Sg1 outputted from the supervisory unit 85 is H, the logical state of the failure notification signal FMCU is L. Further, even in a case where a failure occurs in the intermediate power source circuit 62 or the first to third low voltage power source circuits 63 to 65 as the power source of the microprocessor 60, the logical state of the second determination signal Sg2 outputted from the microprocessor 60 is L.

The failure detecting circuit 87*a* turns the changeover switch 87*b* ON when determined that the logical state of the failure notification signal FMCU is L. Thus, the determination voltage Vjin to be transmitted to the UVLO terminal of the insulated power source 80 decreases towards 0V as the ground potential.

At step S11, the power source control unit of the insulated power source 80 waits till the determination voltage Vjin becomes a voltage below the low voltage threshold VUVLO. The power source control unit performs, when determined that the determination voltage Vjin is below the low voltage threshold VUVLO, the low-voltage malfunction prevention process at step S12 to stop the insulated power source 80. Thus, the upper and lower arm drive voltages VdH and VdL outputted from the insulated power source 80 decrease towards 0V.

At step S13, the high voltage side ASC command unit 91 detects the lower arm drive voltage VdL outputted from the insulated power source 80, and commands the emergency power source 90 to be activated after the detected lower arm drive voltage VdL starts to decrease. Thus, at step S14, the emergency drive voltage Veps starts to be output from the emergency power source 90.

Specifically, the high voltage side ASC command unit 91 commands the emergency power source 90 to be activated when a sufficient period for turning the upper arm switch OFF elapses after the detected lower arm drive voltage VdL starts to decrease. This is to prevent the upper and lower circuits from being short-circuited.

For example, the high voltage side ASC command unit 91 may command the emergency power source 90 to be activated when determined that the detected lower arm drive voltage VdL is below the predetermined voltage Vp after the detected lower arm drive voltage VdL starts to decrease. Here, the predetermined voltage Vp is set to be a value capable of determining that sufficient time elapses for turning the upper arm switch SWH OFF. For example, the predetermined voltage Vp may be set to be a value which is the same as the threshold voltage Vth or a value which is less than the threshold voltage Vth.

Moreover, for example, the high voltage side ASC command unit 91 may command the emergency power source to be activated at a timing where a predetermined period elapses after the detected lower arm drive voltage VdL starts to decrease. The above-described predetermined period may be set to be a value capable of determining that sufficient time elapses for turning the upper arm switch SWH OFF.

Thereafter, at step S15, the high voltage side ASC command unit 91 outputs a high voltage side ASC command SgASC to the lower arm driving unit 82*a*. Thus, at step S16, the lower arm driving unit 82*a* turns the three-phases lower arm switches SWL ON. That is, the three-phase short-circuit control is performed in which the lower arm switches SWL as ON side switches of three-phases are turned ON, and the upper arm switches SWH as OFF side switches of three-phases are turned OFF.

Figure 6:
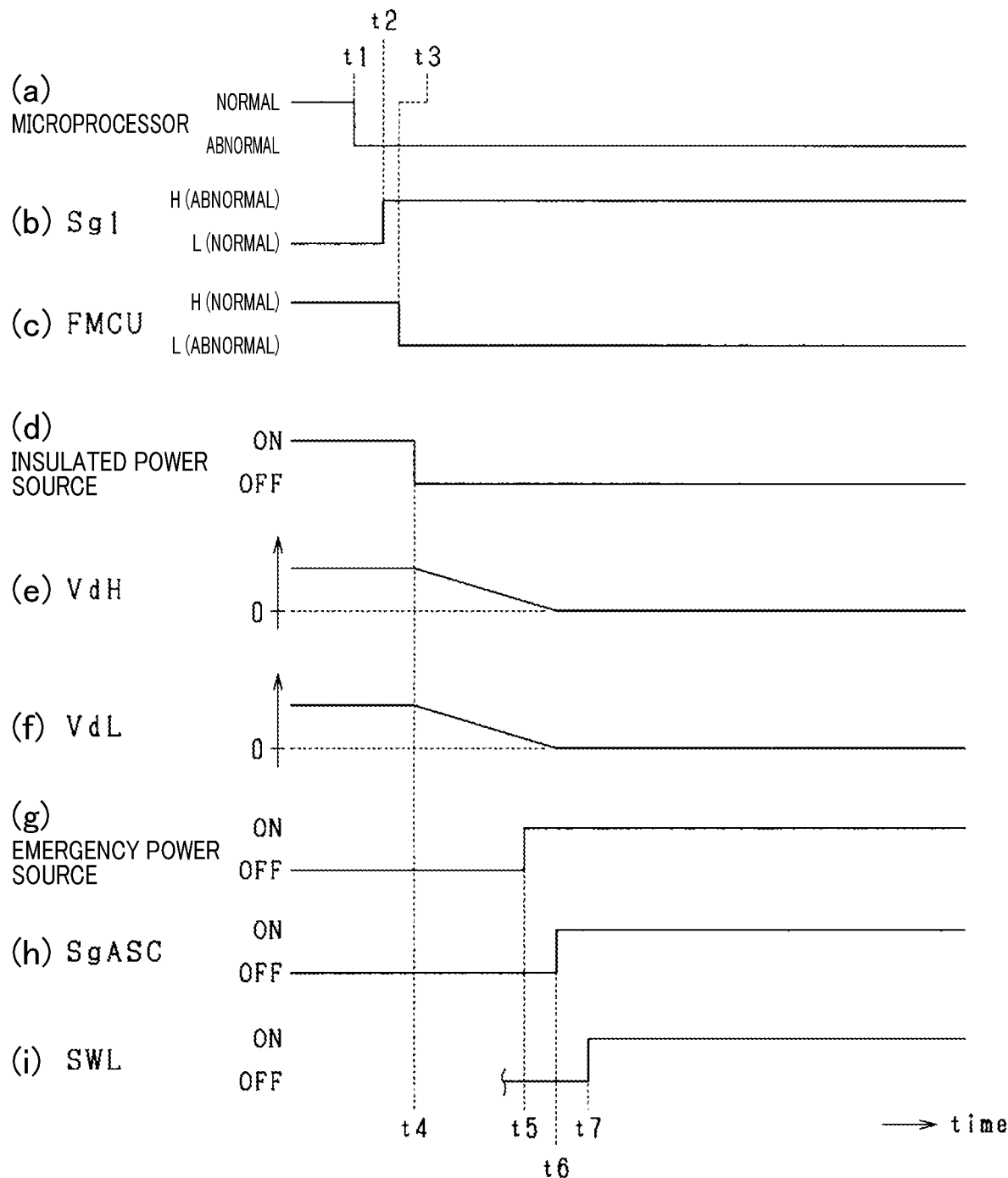
FIG. 6 is a timing diagram showing an example of a three-phase short-circuit control performed in response to the high voltage side ASC command.

With reference to FIG. 6, processes shown in FIG. 5 will be described more in detail. In FIG. 6, a timing labeled (a) indicates a trend of whether a failure occurs on the microprocessor 60, a timing labeled (b) indicates a trend of the first determination signal Sg1 outputted from the supervisory unit 85, a timing labeled (c) indicates a trend of the failure notification signal FMCU, a timing labeled (d) indicates an operational state of the insulated power source 80. The timings labeled (e) and (f) indicate trend of the upper and lower arm drive voltages VdH and VdL outputted from the insulated power source 80, a timing labeled (g) indicates a trend of the emergency power source 90, a timing labeled (h) indicates a trend of the high voltage side ASC command SgASC, and a timing labeled (i) indicates a trend of the driving state of the lower arm switch SWL in each phase.

At time t1, a failure occurs on the microprocessor 60. Hence, at time t2, the logical state of the first determination signal Sg1 outputted from the supervisory unit 85 is inverted and at time t3, the logical state of the failure notification signal FMCU is inverted to L. As a result, the changeover switch 87*b* is turned to be ON and the low-voltage malfunction prevention process is executed. Thus, at time t4, the insulated power source 80 is stopped and the upper and lower arm drive voltages VdH and VdL starts to decrease.

After the lower arm drive voltage VdL starts to decrease, at a time t5 where a sufficient period for turning the upper arm switch SWH OFF elapses, the high voltage side ASC command unit 91 commands the emergency power source 90 to be activated. Thus, the emergency power source 90 starts to output the emergency drive voltage Veps. As described above, the determination whether sufficient period elapses may be made, for example, by determining whether the detected lower arm drive voltage VdL is below the predetermined voltage Vp or determining whether a predetermined period elapses from a time when the lower arm drive voltage VdL starts to decrease. Thereafter, at time t6, the high voltage side ASC command unit 91 outputs the high voltage side ASC command SgASC, and a time t7, the lower arm driving unit 82*a* turns the lower arm switches SWL of three-phases ON.

Note that, the three-phase short-circuited control is also performed in the processes at steps S11 to S16 when a failure occurs on the low voltage power source 31 or a failure occurs on the input circuit 61 or a power supply path electrically connecting between the low voltage power source 31 and the control circuit 50 is broken. In this case, with the low voltage malfunction prevention process, the insulated power source 80 is stopped and the upper and lower arm voltages VdH and VdL decreases towards 0V and the three-phase short-circuit control is performed.

Figure 7:
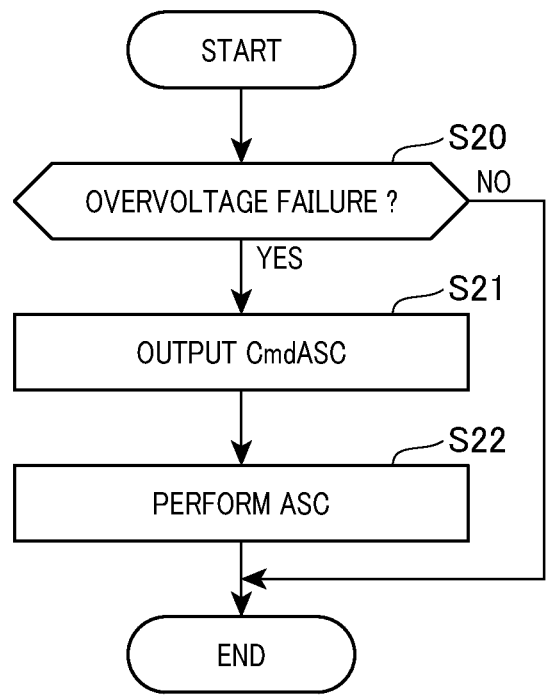
FIG. 7 is a flowchart showing a procedure of a three-phase short-circuit control when an over voltage failure occurs.

Subsequently, with reference to FIG. 7, a three-phase short-circuit control performed when an overvoltage failure occurs will be described.

At step S20, the state determination unit 79 determines whether an overvoltage signal is transmitted thereto from the overvoltage detection unit 78.

When the overvoltage signal is transmitted, the state determination unit 79 outputs, at step S21, the low voltage side ASC command CmdASC to the low voltage side ASC command unit 84.

At step S22, the low voltage side ASC command unit 84 outputs, when the low voltage side ASC command CmdASC is transmitted, a shutdown command CmdSDN that forcibly changes the switching command transmitted to the three-phase upper arm drivers 81 to be OFF command regardless of the switching command outputted from the microprocessor 60. Further, the low voltage side ASC command unit 84 forcibly changes the switching command transmitted to three-phase lower drivers 82 to be ON command regardless of the switching command outputted from the microprocessor 60. Thus, the three-phase short-circuit control is performed.

Figure 8:
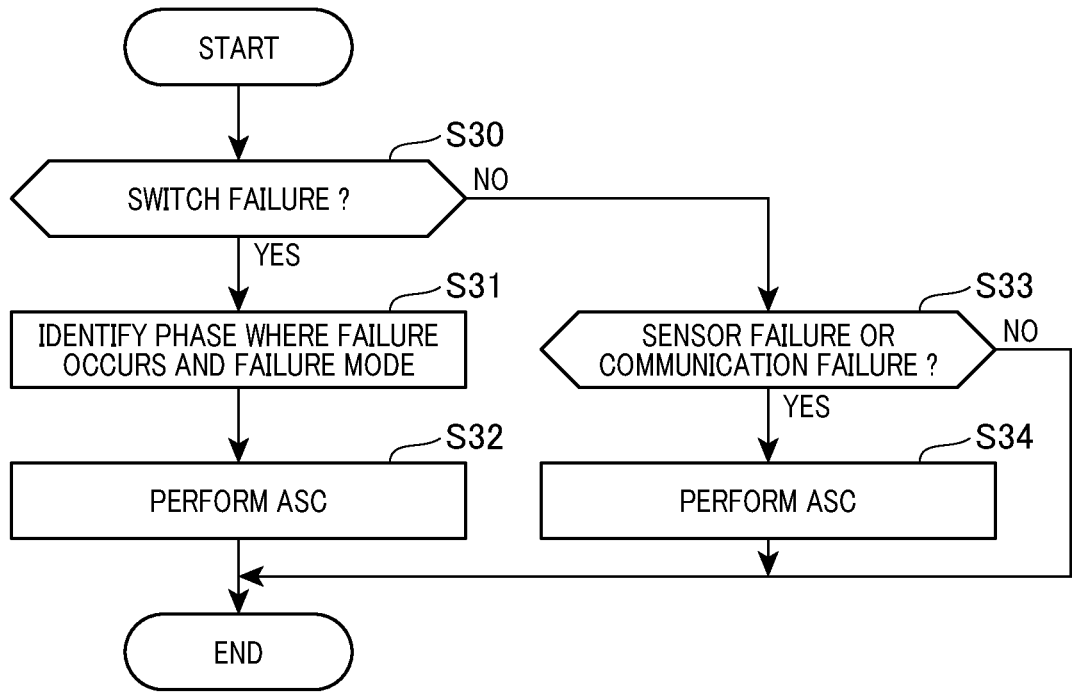
FIG. 8 is a flowchart showing a procedure of the three-phase short-circuit control when a switch failure occurs.

With reference to FIG. 8, a three-phase short-circuit control performed when another failure occurs will be described. The processes shown in FIG. 8 is executed by the microprocessor 60.

At step S30, the process determines whether a failure occurs on any one of upper and lower arm switches SWH and SWL based on the failure signal transmitted from the failure detection unit 83.

If the determination at step S30 is affirmative, the process proceeds to step S31, and identifies a phase and an arm of the switch where a failure occurs among respective upper and lower arm switches SWH and SWL and identifies whether the failure is an open failure or a short failure.

At step S32, when a short circuit failure occurs on at least one switch in either one arm between upper and lower arms, the process outputs an ON command as a switching command to three-phase switches in the arm where the short circuit failure occurs and outputs the OFF command as a switching command to the three-phase switches in the other arm. Thus, the three-phase short-circuit control is performed.

On the other hand, when an open circuit failure occurs on at least one switch in either one arm between upper and lower arms, the process outputs the ON command to the three-phase switches in an arm other than the arm where the open failure occurs in the upper and lower arms, and outputs the OFF command to the three-phase switches in the other arm. Thus, the three-phase shot-circuit failure is performed. Thus, three-phase short-circuit control is performed.

When the determination at step S30 is negative, the process proceeds to step S33, and determines whether a sensor failure or a communication failure occurs. The sensor failure includes a failure occurs on at least one of the phase current sensor 40, the angle sensor 41, the temperature sensor 42 and the voltage sensor 77. The failure of the phase current sensor 40 includes at least one of a failure on the phase current sensor 40 itself and a failure of the current interface 70. The failure of the angle sensor 41 includes at least one of a failure of the angle sensor 41 itself, a failure of the excitation circuit 71, a failure of the FB interface 72 and a failure of the resolver digital converter 73. The failure of the temperature sensor 42 includes at least one of a failure of the temperature sensor 42 itself, and a failure of the temperature interface 74.

Also, the communication failure includes a failure of at least one of the first CAN transceiver 75, the second CAN transceiver 76, the first CAN bus 43 and the second CAN bus 44.

At step S34, the process outputs an OFF command as a switching command to the three-phase upper arm switches SWH, and outputs an ON command as a switching command the three-phase lower arm switches SWL. Thus, the three-phase short-circuit control is performed.

Subsequently, an activation method of the control system will be described. Here, two activation methods will be described.

Figure 9:
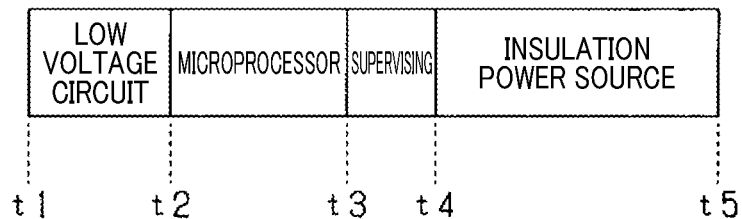
FIG. 9 is a diagram showing an activation of a control system.

Firstly, with reference to FIG. 9, one activation method will be described.

At time t1, the power is supplied to the control circuit 50 from the low voltage power source 31, and respective power source circuits 62 to 67 are activated at time t2. Thereafter, the power is supplied to the microprocessor 60 from the first to third low voltage power source circuits 63 to 65 and the microprocessor 60 is activated at a time t3. Subsequently, at time t3 to t4, the supervisory unit 85 executes the initial supervising process for the microprocessor 60. In the case where the supervisory unit 85 determines that no failure occurs on the microprocessor 60, at time t4, the logical state of the failure notification signal FMCU is changed to H. Thus, at time t5, the determination voltage Vjin transmitted to the UVLO terminal of the insulated power source 80 exceeds the release threshold and the insulated power source 80 is activated.

Figure 10:
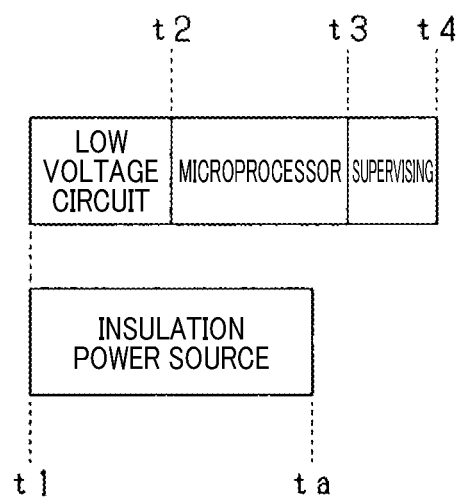
FIG. 10 is a diagram showing an activation of the control system.
Figure 11:
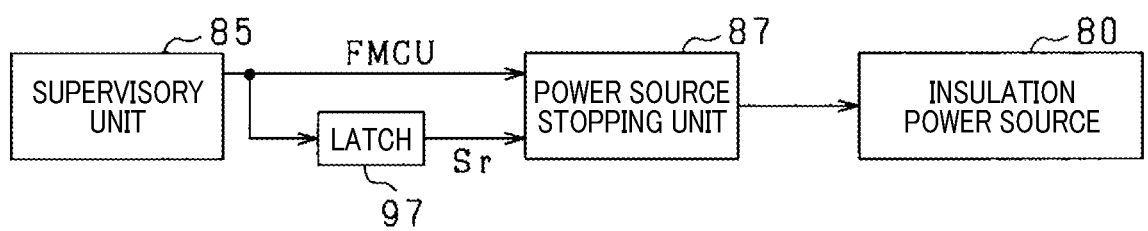
FIG. 11 is a block diagram for explaining how to activate the control system.

Subsequently, with reference to FIGS. 10 and 11, the other activation method will be described.

At time t1, the power is supplied to the low voltage power source 31 to the control circuit 50 and respective power source circuits 62 to 67 are activated at time t2. Thereafter, the power is supplied to the microprocessor 60 from the first to third low voltage power source circuits 63 to 65, and the microprocessor 60 is activated at time t3.

At the time t3 to t4, the supervisory unit 85 executes the initial supervising process for the microprocessor 60. The supervisory unit 85 changes the logical state of the second determination signal Sg2 to be H at time t4, thereby setting the logical state of the failure notification signal FMCU to be H. A latch 97 included in the control circuit 50 latches the failure notification signal FMCU and outputs the latched signal to the power source stopping unit 87 as a latch signal Sr so as to enable a stopping function of the insulated power source 80.

On the other hand, at time t1, the power is supplied to the insulated power source 80, and at a time to which is earlier than time t3 and latter than a time t2, the insulated power source 80 is activated. Here, the power source stopping unit 87, when the logical state of the failure notification signal FMCU is H in a state where the logical state Sr is H, maintains the changeover switch 87b to be OFF and continues the operation of the insulated power source 80. Moreover, the power source stopping unit 87, when the logical state of the failure notification signal FMCU is L in a state where the logical state Sr is H, maintains the changeover switch 87b to be ON and stops the operation of the insulated power source 80. According to the other method, the preparation for executing the three-phase short-circuit control can be completed earlier.

According to the present embodiment described in detail in the above, the following effects and advantages can be obtained.

The logical states of the first determination signal Sg1 outputted from the supervisory unit 85 and the second determination signal Sg2 outputted from the microprocessor 60 become L, whereby the logical state of the failure notification signal FMCU. Then, when determined that the logical state of the failure notification signal FMCU is L in the power source stopping unit 87, the power generated by the emergency power source 90 powered by the smoothing capacitor 24 is used to perform the three-phase short-circuit control in response to a command from the high voltage side ASC command unit 91. Thus, even in a case where a failure occurs in the control circuit 50 which may cause a shutdown state according to the conventional configuration, the three-phase short-circuit control can be appropriately performed without causing the shutdown state.

The high voltage side ASC command unit 91 outputs the high voltage side ASC command SgASC to the lower arm driving unit 82a after the detected lower arm drive voltage VdL starts to decrease. According to this configuration, by using the lower arm drive voltage VdL, the command for executing the three-phase short-circuit control can be transmitted from the lower voltage region to the higher voltage region. Hence, without adding a dedicated insulation interface for transmitting the command from the lower voltage region to the higher voltage region, the three-phase short-circuit control can be performed when a failure in which power cannot be supplied to the control circuit 50 from the low voltage power source 31 occurs or a failure occurs on the control circuit 50.

The microprocessor 60 is configured to operate by being supplied with power from the first to third low voltage power source circuit 63 to 65, and the power source stopping unit 87 is configured to operate by being supplied with power from the fourth low voltage power source circuit 66 which is different from the first to third low voltage power source circuit 63 to 65. According to this configuration, even when a failure occurs on any one of the first to third low voltage power source circuits 63 to 65, the power source stopping unit 87 can be operated by the fourth low voltage power source circuit 66. In other words, dependent failure in which the power source stopping unit is unable to operate because of a failure occurs on any one of the first to third low voltage power source circuits 63 to 65 can be avoided. Hence, the three-phase short-circuit control utilizing the power source stopping unit 87 can be appropriately performed. Further, according to the method to stop the insulated power source 80 by the power source stopping unit 87, for example, the three-phase short-circuit control can be appropriately performed even when a failure occurs not only on the microprocessor 60 but also on a signal transmission path for the switching command from the microprocessor 60 to respective driving units 81*a* and 82*a*.

(Modification of the First Embodiment)

Figure 4:
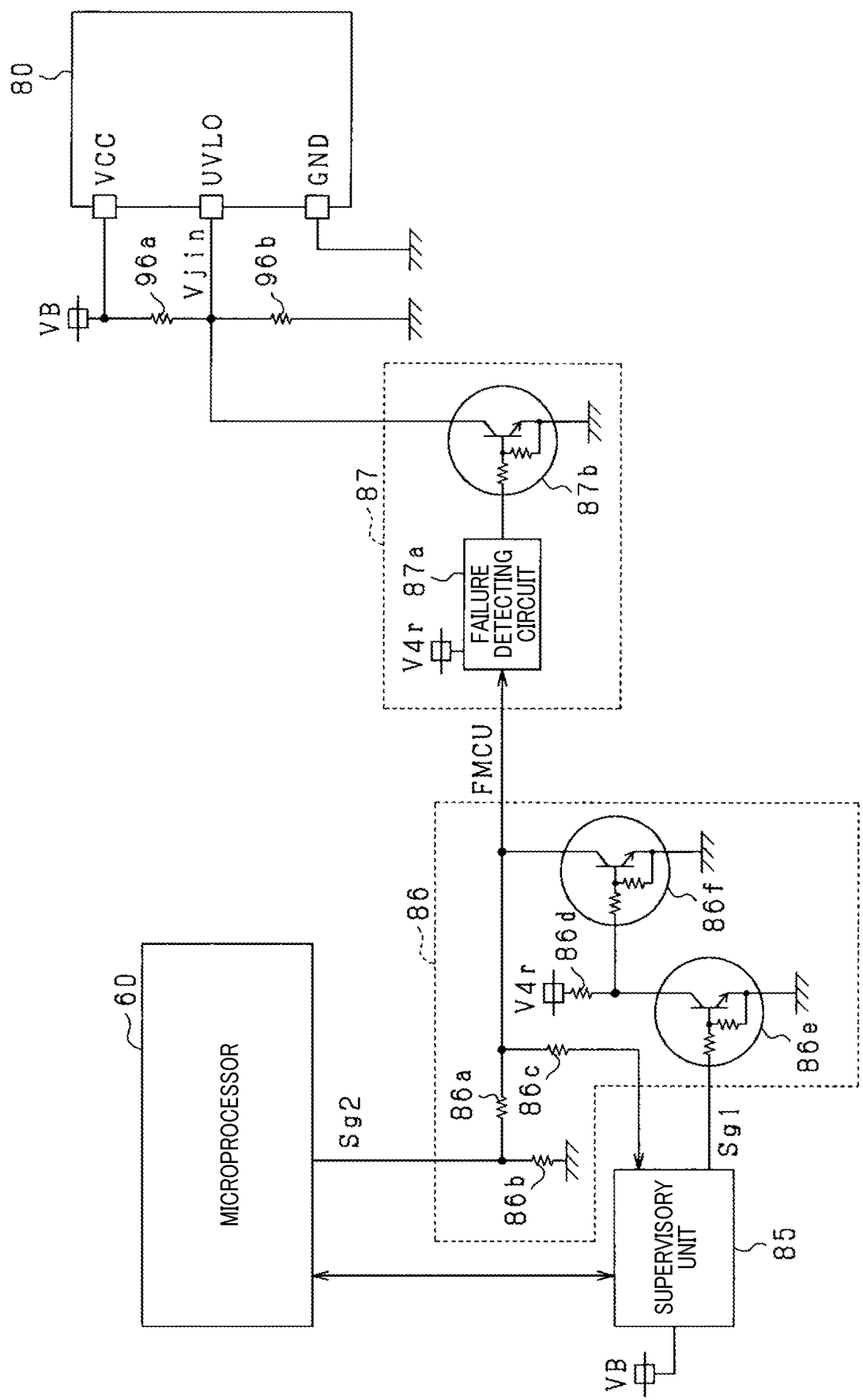
FIG. 4 is a diagram showing an OR circuit, power source stopping unit and their peripheral configuration.

In FIG. 4, as a source for generating the failure notification signal FMCU to stop the insulated power source 80, either the first determination signal Sg1 or the second determination signal Sg2 may be utilized.

The high voltage side ASC command unit 91 may outputs, based on the upper arm drive voltage VdH, the high voltage side ASC command SgASC instead of the lower arm drive voltage VdL. In this case, the high voltage side ASC command unit 91 may acquire the information of the upper arm drive voltage VdH via the insulation interface.

A voltage supplied to the supervisory unit 85 is not limited to the output voltage VB of the input circuit 61. However, as the voltage supplied to the supervisory unit 85, a voltage of another power source may be utilized excluding the output voltages of the first to third low voltage power source circuit 63 to 65.

The power source control unit that constitutes the insulated power source 80 may be provided for each of the upper arm insulated power source and the lower arm insulated power source individually. In this case, with the low voltage malfunction prevention process, the insulated power source 80 may be stopped by stopping both of the power source control unit provided corresponding to the upper arm insulated power source and the power source control unit provided corresponding to the lower arm insulated power source.

As the three-phase short-circuit control, the three phase upper arm switches SWH may be turned ON and three phase lower arm switches SWL are turned OFF. In this case, the emergency power source 90 may be provided for each of the three phase upper arm driving units 81*a* individually.

When a coupler failure occurs in which the first voltage V1*r* of the first low voltage power source circuit 63 is not supplied to the configuration in the lower voltage region side of the upper and lower arm insulation interfaces 81*b* and 82*b* which constitute the upper and lower arm drivers 81 and 82, the switching command from the microprocessor 60 cannot be transmitted to the upper and lower arm driving units 81*a* and 82*a*. In this case, a shutdown state is produced. In order to deal with this problem, the following configuration can be employed.

The power supplying source for the configuration in the lower voltage region of the lower arm insulation interface 82*b* is configured as a power source circuit other than the first low voltage power source circuit 63 (hereinafter referred to as another power source circuit). As another power source circuit, for example, a power source where no dependent failure occurs even when a failure occurs on the first low voltage power source circuit 63. Specifically, a fifth power source circuit that generates a fifth voltage V5*r* (e.g. 5V) by stepping down the output voltage Vm of the intermediate power source circuit 62 can be utilized.

According to this configuration, when the output voltage of another power source circuit decreases, the insulated power source 80 may be stopped and the high voltage side ASC command SgASC may be outputted from the high voltage side ASC command unit 91 to the lower arm driving unit 82*a*. Specifically, for example, the failure detecting circuit 87*a* of the power source stopping unit 87 detects the output voltage of the other power source circuit, and may change the changeover switch 87*b* to be ON when the detected output voltage decreases. According to the above-described configuration, even when the coupler failure occurs, the three-phase short-circuit control can be performed.

Second Embodiment

Figure 12:
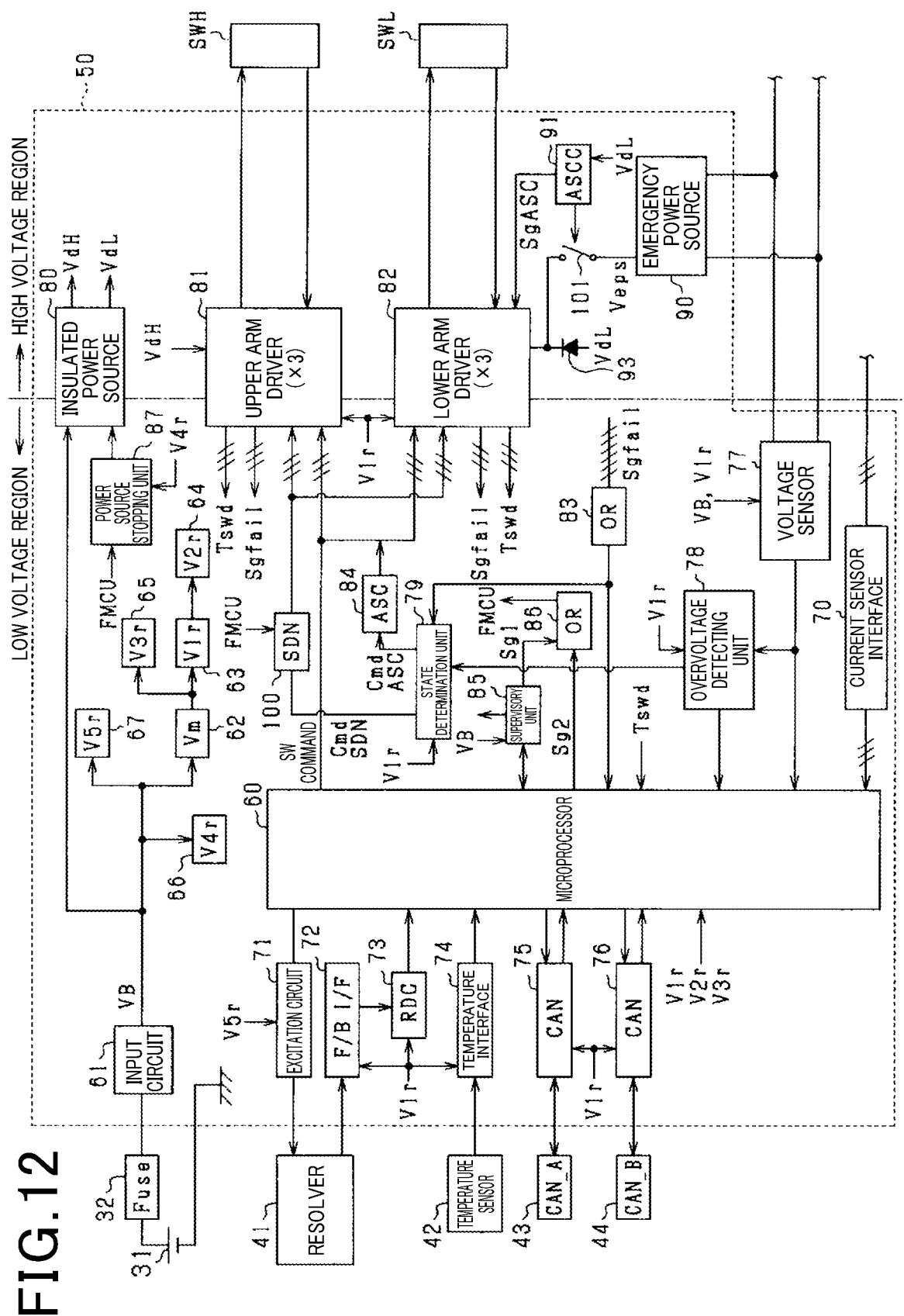
FIG. 12 is a diagram showing a control circuit and its peripheral configuration according to a second embodiment.
Figure 13:
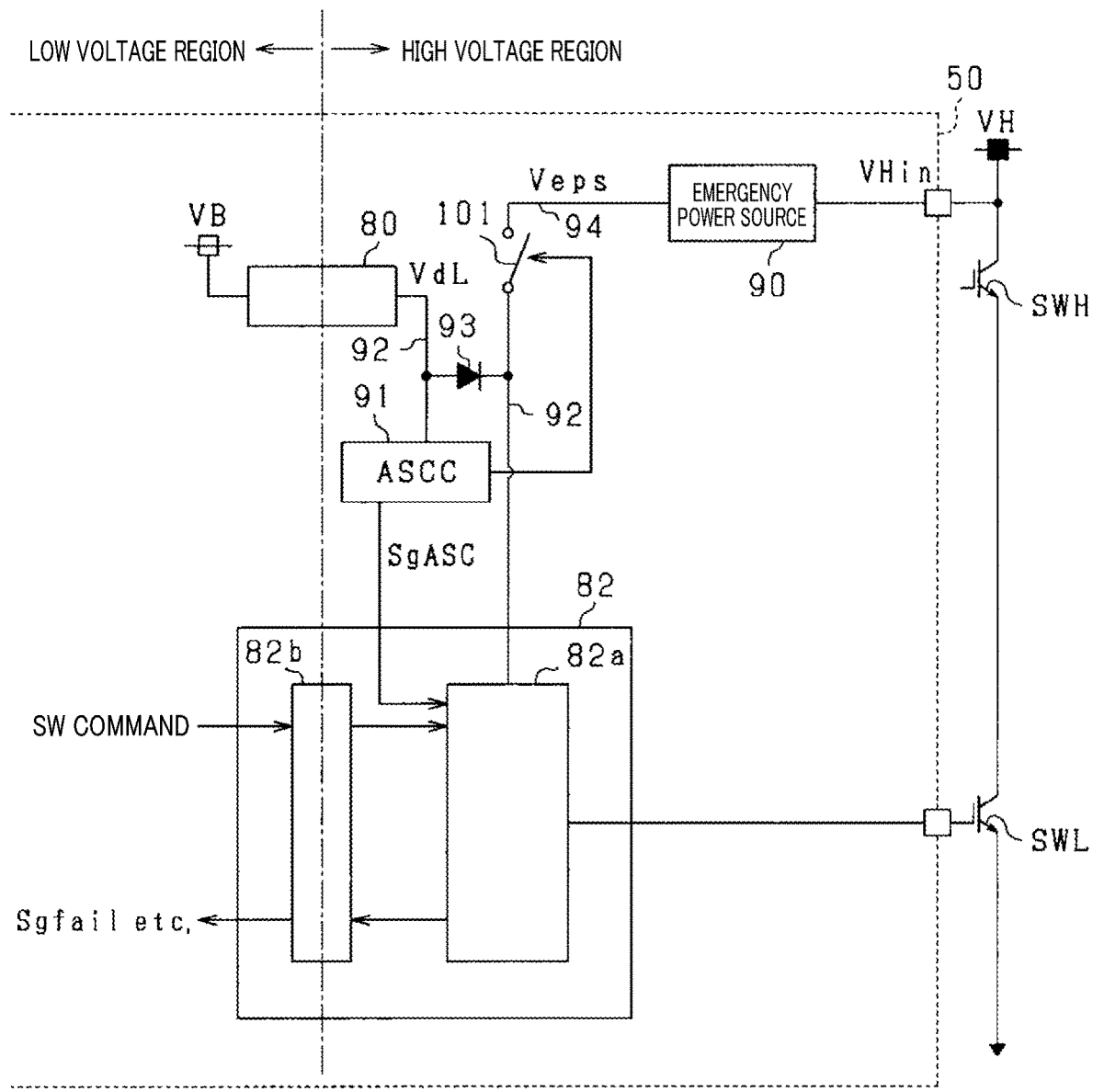
FIG. 13 is a diagram showing an upper and lower arm drivers and their peripheral configuration.

Hereinafter, with reference to the drawings, a second embodiment will be described mainly for configurations different from those in the first embodiment. According to the present embodiment, as shown in FIGS. 12 and 13, a part of the configuration of the high voltage region side of the control circuit 50 is changed. Note that, in FIGS. 12 and 13, the same reference numbers are applied to the configurations shown in FIGS. 2 and 3 for the sake of convenience.

As shown in FIG. 12, in the lower voltage region of the control circuit 50, a shutdown command unit 100 is provided as an enforced OFF unit. The shutdown command unit 100 is configured of a logic circuit, accepting the emergency notification signal FMCU from the OR circuit 86. The shutdown command unit 100, when the logical state of the emergency notification signal FMCU to be accepted is H, changes the switching command for the upper and lower drivers 81 and 82 for three-phases to be forcibly OFF command regardless of the switching command from the microprocessor 60. According to this configuration, the three-phase short-circuit control is able to start without waiting for a decrease of the upper arm drive voltage VdH. In other words, when a failure occurs in the control circuit 50, the three-phase short-circuit control can be promptly started.

As shown in FIG. 13, in the normal-use power source path 92, an emergency switch 101 is provided instead of the emergency diode 95. The high voltage side ASC command unit 91 changes the emergency switch 101 to be ON when the detected lower arm drive voltage VdL starts to decrease. Thus, the emergency drive voltage Veps is supplied to the lower arm driving unit 82*a* from the emergency power source 90. Note that, the high voltage side ASC command unit 91 may output the high voltage side ASC command SgASC to the lower arm driving unit 82a after the shutdown command unit 100 changes the switching command to be forcibly OFF command.

In the present embodiment, the emergency power source 90 is activated at a timing where an input voltage VHin thereof exceeds a prescribed voltage Vα in a period from when the input voltage VHin of the emergency power source 90 starts to increase from 0V when the first and second cutoff switches 23a and 23b are turned ON to when the input voltage VHin of the emergency power source 90 reaches the terminal voltage VH of the smoothing capacitor 24 (terminal voltage of the high voltage power source 30). Specifically, the above-mentioned prescribed voltage Vα is a voltage with which the control unit of the emergency power source 90 is activated. For example, this activation voltage is set to be the same value as a release threshold of the low voltage malfunction prevention process.

Figure 14:
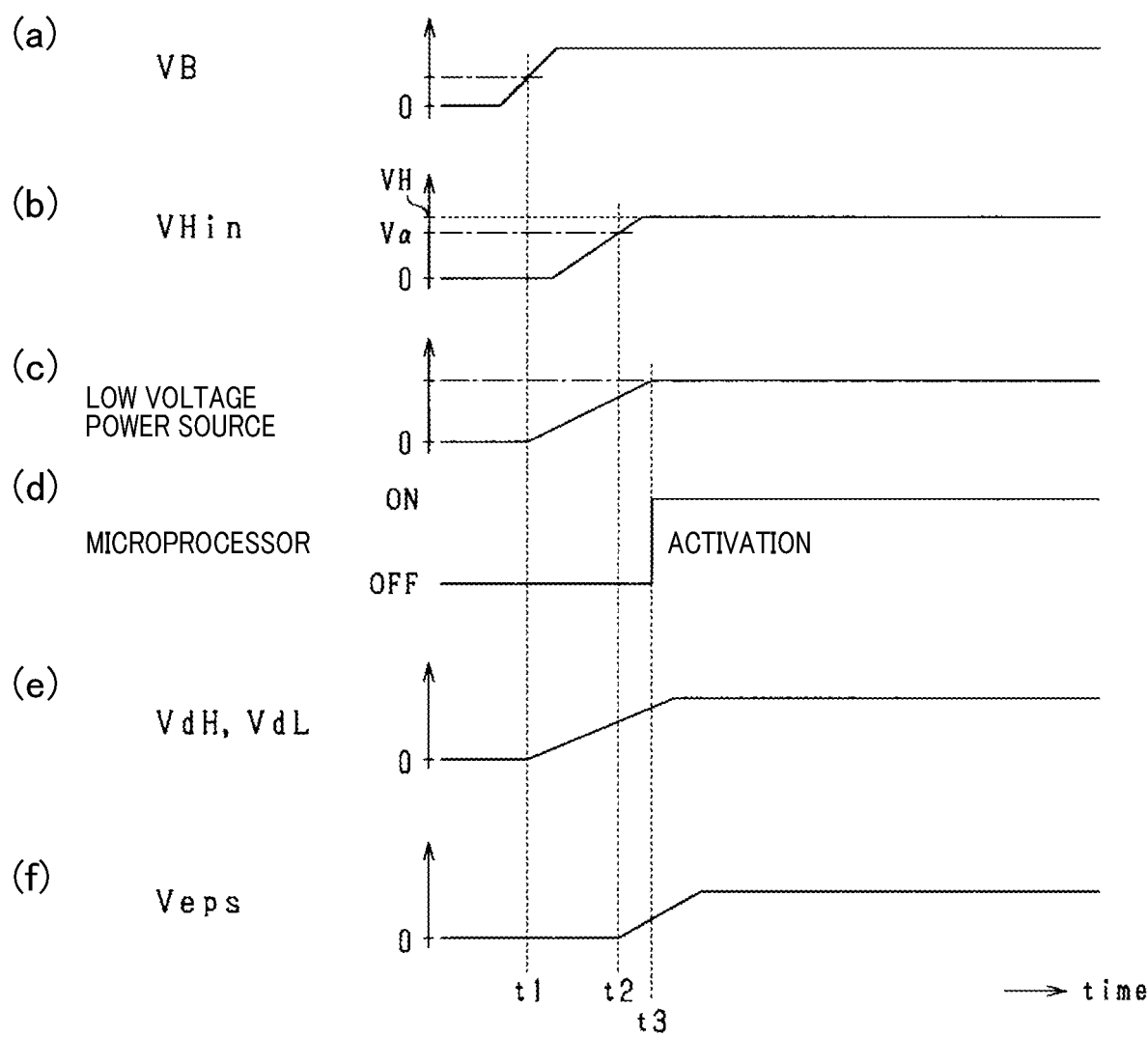
FIG. 14 is a timing diagram showing an activation of an emergency power source.

With reference to FIG. 14, an operation of the emergency power source 90 will be described. In FIG. 14, a timing labeled as (a) indicates a change in the output voltage VB of the input circuit 61, a timing labeled as (b) indicates a change in the input voltage VHin of the emergency power source 90, a timing labeled as (c) indicates a change in the output voltage of the first to third low voltage power source circuits 63 to 65, a timing labeled as (d) indicates a change in the operation state of the microprocessor 60, a timing labeled as (e) indicates a change in the upper and lower arm drive voltages VdH and VdL outputted from the insulated power source 80, and a timing labeled as (f) indicates a change in the output voltage Veps of the emergency power source 90.

Note that the respective output voltages of the first to third low voltage power source circuits 63 to 65 are actually different, but a change in the respective output voltages is simplified in the timing (c) in FIG. 14.

At time t1, the output voltage VB of the input circuit 61 reaches a predetermined voltage and the output voltages of the first to third low voltage power source circuits 63 to 65 starts to increase. After the first and second cutoff switches 23a and 23b are turned ON, the input voltage VHin of the emergency power source 90 exceeds the prescribed voltage Vα at time t2 and the emergency power source 90 is activated. Thereafter, at time t3, the microprocessor 60 is activated.

With the above-described configuration, the emergency power source 90 starts to operate before the logical state of the emergency notification signal FMCU outputted from the OR circuit 86 is inverted. Hence, the emergency switch 101 is turned ON, whereby the emergency power source 90 promptly starts to supply the emergency drive voltage Veps to the lower arm driving unit 82a.

According to the above-described embodiments, the following effects and advantages can be obtained.

The shutdown command unit 100 provided in the lower voltage region, when the logical state of the emergency notification signal FMCU to be accepted is H, changes the switching command for the upper and lower drivers 81 and 82 for three-phases to be forcibly OFF command regardless of the switching command from the microprocessor 60. Thus, the three-phase short-circuit control is able to start without waiting for a decrease of the upper arm drive voltage VdH. That is, the three-phase short-circuit control can be promptly started.

The emergency power source 90 is activated at a timing where an input voltage VHin thereof exceeds a prescribed voltage Vα in a period from when the input voltage VHin of the emergency power source 90 starts to increase from 0V when the first and second cutoff switches 23a and 23b are turned ON to when the input voltage VHin of the emergency power source 90 reaches the terminal voltage VH of the smoothing capacitor 24. In other words, the emergency power source 90 starts to operate before the logical state of the emergency notification signal FMCU outputted from the OR circuit 86 is inverted. Hence, the emergency switch 101 is turned ON, whereby the emergency power source 90 promptly starts to supply the emergency drive voltage Veps to the lower arm driving unit 82a. Thus, the three-phase short-circuit control can be promptly started.

(Modification of the Second Embodiment)

The shutdown command unit 100 may forcibly change the switching command to either the upper arm driver 81 or the lower arm driver 82 to be OFF command. For example, the shutdown command unit 100 changes the switching command to only the upper arm drivers 81 for three phases to be OFF command, and turns the lower arm switches SWL for three phases ON which is triggered by a decrease in the lower arm drive voltage VdL similar to the first embodiment.

The trigger of forcibly changing the switching command to be OFF by the shutdown command unit 100 is not limited to the emergency notification signal FMCU, but may be other signal that commands an execution of the three-phase short-circuit control.

A configuration for forcibly changing the upper arm switch SWH to be OFF is not limited to a configuration using the shutdown command unit 100. For example, a configuration in which the upper arm drive voltage VdH is stopped to supply to the upper arm driver 81, thereby stopping the upper arm driver 81, or a configuration in which the OFF command is transmitted to the upper arm driving unit 81a via an insulation interface other than the upper arm insulation interface 81b to forcibly change the upper arm switch SWH to be OFF.

Third Embodiment

Figure 15:
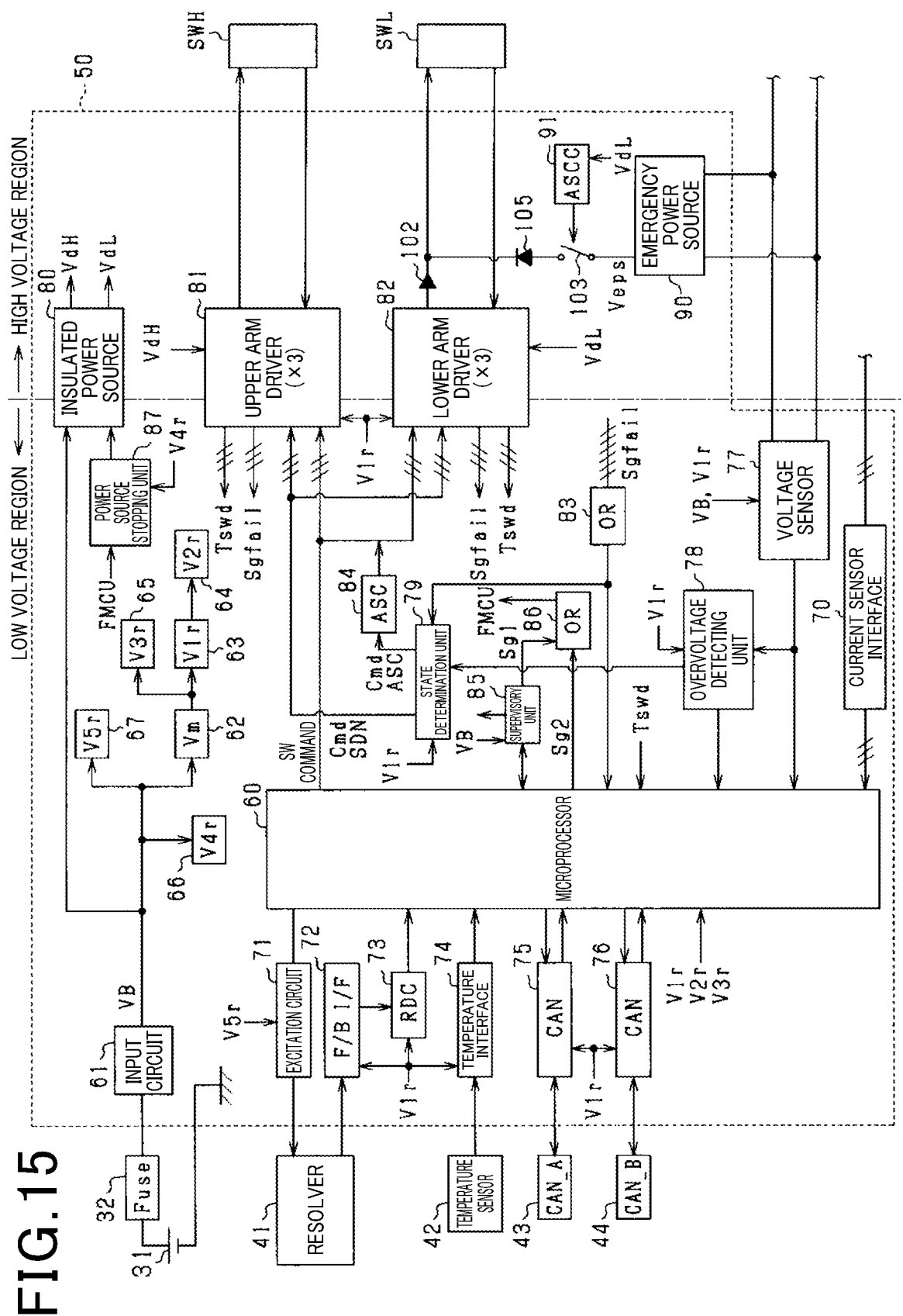
FIG. 15 is a diagram showing a control circuit and its peripheral configuration according to a third embodiment.
Figure 16:
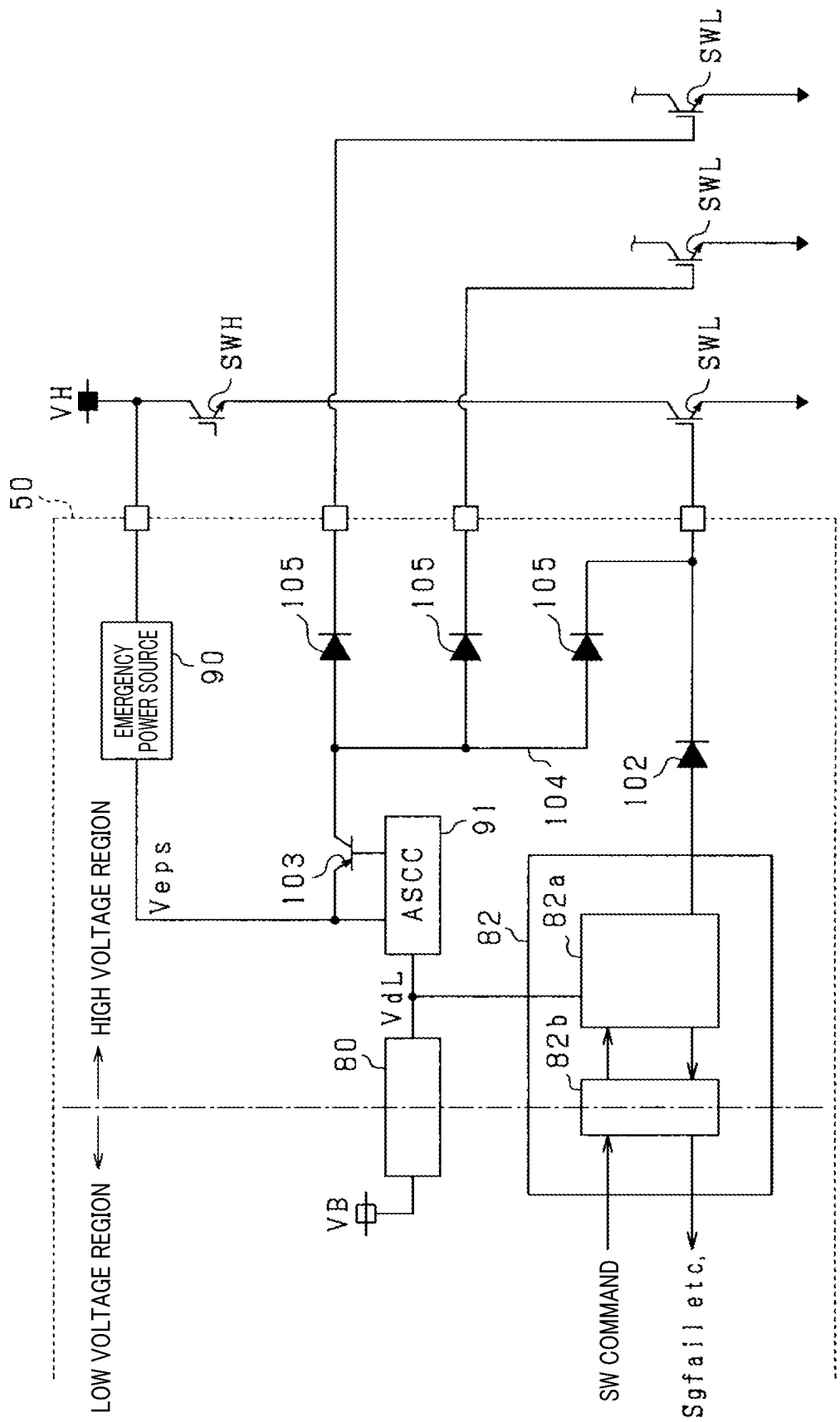
FIG. 16 is a diagram showing an upper and lower arm drivers and their peripheral configuration.

Hereinafter, with reference to the drawings, a third embodiment will be described mainly for configurations different from those in the second embodiment. According to the present embodiment, as shown in FIGS. 15 and 16, a configuration of the higher voltage region side of the control circuit 50 is partly modified. In FIGS. 15 and 16, the same reference numbers are applied to configurations shown in FIGS. 12 and 13 for the sake of convenience. Also, according to the present embodiment, the activation timing of the emergency power source 90 is the same as that of the second embodiment.

In the higher voltage region of the control circuit 50, a first limiting diode 102 is disposed in a gate charge-discharge path that connects the lower arm driving unit 82a and the gate of the lower arm switch SWL. The first limiting diode 102 is disposed in a state where the anode is connected to a lower arm driving unit 82a side. Note that illustration of the gate discharge path of the lower arm switch SWL is omitted in FIG. 16.

The control circuit 50 is provided with an emergency switch 103. The emergency switch 103 connects between the output side of the emergency power source 90 and a common path 104. Each gate of the lower arm switches SWL is connected to the common path 104 via the limiting diode 105.

The high voltage side ASC command unit 91 changes the emergency switch 103 to be ON after the detected lower arm drive voltage VdL. Thus, the emergency power source 90 starts to directly supply the emergency drive voltage Veps to the gate of each lower arm switch SWL. As a result, the three-phase short-circuit control is performed. Note that the high voltage side ASC command unit 91 may change the emergency switch 103 to be ON with the same method as described in step S13 shown in FIG. 5.

Other Embodiments

The above-described embodiments may be modified as follows.

As a rotating electric machine, it is not limited to the one having a single winding group but may be one having a plurality of winding groups. In this case, a plurality of switching device units are provided corresponding to respective winding groups. In this configuration, the control circuit 50 may perform the three-phase short-circuit control for at least one switching device unit in a part of respective switching device units, and may continue to perform the regular control without the three-phase short-circuit control for other switching device units.

Figure 17:
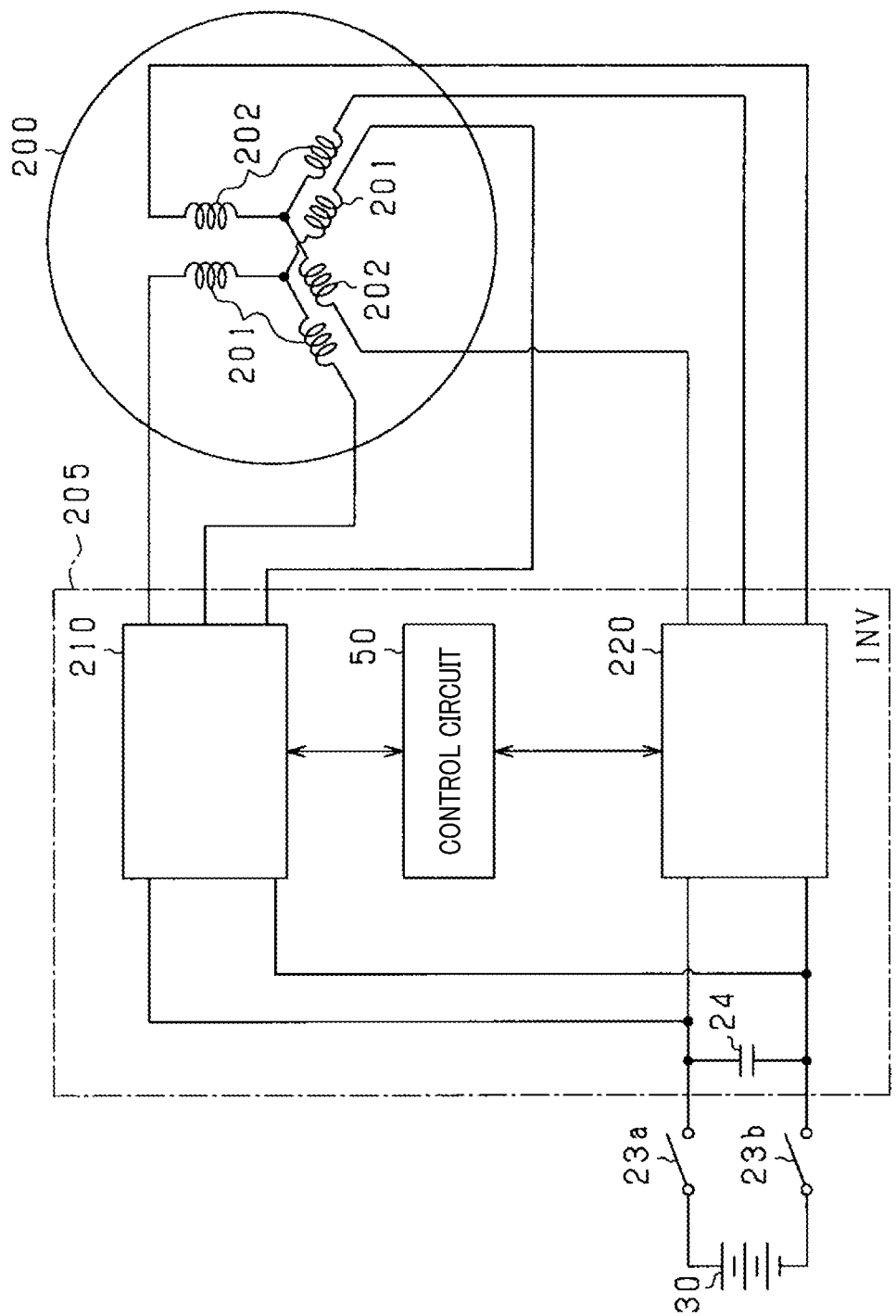
FIG. 17 is a diagram showing an overall configuration of a control system according to other embodiments.

FIG. 17 shows a configuration example in which the control system is provided with a six phase rotating electric machine 200 having two winding groups and an inverter 205. The inverter 205 is provided with a first switching device unit 210 and a second switching device unit 220. The rotating electric machine 200 includes the first winding group 201 and a second winding group 202. A first switching device unit 210 is connected to the first winding group 201 and a second switching device unit 220 is connected to the second winding group 202. In this configuration, the control circuit 50 may perform the three-phase short-circuit control to, for example, only the first switching device unit 210 in the respective switching device units 210 and 220, and may continue the control to the second switching device unit 220.

Note that, in order to provide a redundant configuration of the control circuit, a plurality of control circuits (e.g. two in number) may be provided in the control system. Further, in order to provide a redundant configuration of the control circuit, a plurality of low voltage power sources (e.g. two in number) for the control circuit may be provided in the control system.

As the rotating electric machine, for example, one having nine-phase winding may be provided.

As the emergency power source 90, it is not limited to the switching power source (specifically, insulation type, or non-insulation type switching power source). However, the emergency power source may be configured as, for example, a series-regulator type power source or a power source constituted of a Zener diode.

In the second and third embodiments, as described in the modification example of the first embodiment, another power source circuit may be provided preparing for a case where a coupler failure occurs, and the insulated power source 80 may be stopped when the output voltage of another power source circuit is lowered to perform a three-phase short-circuit control.

As the drivers 81 and 82, a driver disposed only in the higher voltage region may be utilized without being positioned across a boundary portion between the lower voltage region and the higher voltage region.

In the configuration shown in FIG. 1, a boost converter may be provided between the smoothing capacitor 24 and respective cutoff switches 23a and 23b.

As a switch that constitutes the switching device unit, it is not limited to IGBT, but may be a N-channel MOSFET integrating a body diode, for example.

As a switch in each arm of the respective phases, two or more switches which are connected in parallel may be used. In this case, a combination of parallelly connected switches may include a combination of a SiC switching element and a Si switching element, a combination of IGBT switch and MOSFET switch.

The controlled variable of the rotating electric machine is not limited to the torque, but may be a rotation speed of the rotor of the rotating electric machine.

As the rotating electric machine, it is not limited to permanent magnet synchronous machine, but may be a field winding synchronous machine. Moreover, as the rotating electric machine, it is not limited to the synchronous machine, but may be an induction machine. Further, as the rotating electric machine, it is not limited to the main motor of the vehicle, but may be one used for other purpose such as a motor that constitutes an electric power steering apparatus and an air conditioning electric compressor.

The control unit and method thereof disclosed in the present disclosure may be accomplished by a dedicated computer constituted of a processor and a memory programmed to execute one or more functions embodied by computer programs. Alternatively, the control unit and method thereof disclosed in the present disclosure may be accomplished by a dedicated computer provided by a processor configured of one or more dedicated hardware logic circuits. Further, the control unit and method thereof disclosed in the present disclosure may be accomplished by one or more dedicated computers where a processor and a memory programmed to execute one or more functions, and a processor configured of one or more hardware logic circuits are combined. Furthermore, the computer programs may be stored, as instruction codes executed by the computer, into a computer readable non-transitory tangible recording media.

The present disclosure has been described in accordance with the embodiments. However, the present disclosure is not limited to the embodiments and structure thereof. The present disclosure includes various modification examples and modifications within the equivalent configurations. Further, various combinations and modes and other combinations and modes including one element or more or less elements of those various combinations are within the range and technical scope of the present disclosure.

(Conclusion)

The present disclosure provides a control circuit of a power converter capable of appropriately performing a short circuit control even when a failure occurs in the control circuit.

Specifically, the present disclosure provides a control circuit of a power converter for a system provided with a power storage unit, a multiphase rotating electric machine, and a power converter having upper arm switches and lower arm switches electrically connected to respective phases of the rotating electric machine, the control circuit includes: a switch command generation unit that generates a switching command for performing a drive control of the rotating electric machine; a switch driving unit that drives the upper and lower arm switches based on the switching command, the switch driving unit being capable of operating with power supplied thereto; an emergency power source that generates an emergency power, the emergency power source being supplied with power from the power storage unit; an abnormality determination unit that determines whether a failure occurs in the control circuit; and an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source.

An abnormality in which a switch command generation unit cannot operate properly may occur in the control circuit. Even in such a case where an abnormality occurs, the short-circuit control is required to be appropriately performed. In this respect, according to the present disclosure, in the case where the abnormality determining unit determines that an abnormality occurs in the control circuit, the short-circuit control is performed by using the power generated by the emergency power source of which the power supply source is the power storage unit. Thus, even in a case where an abnormality occurs in the control circuit which may cause a shutdown state according to a conventional configuration, the short-circuit control can be appropriately performed.

What is claimed is:

1. A control circuit of a power converter for a system provided with a power storage unit, a multiphase rotating electric machine, a power converter having upper arm switches and lower arm switches electrically connected to respective phases of the rotating electric machine and a low voltage power source, the control circuit comprising:
   a switch command generation unit that generates a switching command for performing a drive control of the rotating electric machine;
   a switch driving unit that drives the upper and lower arm switches based on the switching command, the switch driving unit being capable of operating with power supplied thereto;
   an emergency power source that generates an emergency power, the emergency power source being supplied with power from the power storage unit;
   an abnormality determination unit that determines whether a failure occurs in the control circuit; and
   an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source, wherein
   the switch command generation unit, the abnormality determination unit and the low voltage power source are provided in a lower voltage region;
   the power storage unit, the switch driving unit, the emergency power source and the emergency control unit are provided in a higher voltage region which is electrically insulated from the lower voltage region;
   the control circuit further comprises an insulated power source provided in the lower voltage region and the higher voltage region to be positioned across a boundary portion therebetween, the insulated power source being supplied with power from the low voltage power source to supply power to the switch driving unit;
   the abnormality determination unit stops the insulated power source when determined that a failure occurs in the lower voltage region in the control circuit; and
   the emergency control unit detects an output voltage of the insulated power source and performs the short circuit control after the detected output voltage starts to decrease using an emergency power generated by the emergency power source.

2. A control circuit of a power converter for a system provided with a power storage unit, a multiphase rotating electric machine, a power converter having upper arm switches and lower arm switches electrically connected to respective phases of the rotating electric machine and a low voltage power source, the control circuit comprising:
   a switch command generation unit that generates a switching command for performing a drive control of the rotating electric machine;
   a switch driving unit that drives the upper and lower arm switches based on the switching command, the switch driving unit being capable of operating with power supplied thereto;
   an emergency power source that generates an emergency power, the emergency power source being supplied with power from the power storage unit;
   an abnormality determination unit that determines whether a failure occurs in the control circuit; and
   an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source, wherein
   the switch command generation unit, the abnormality determination unit and the low voltage power source are provided in a lower voltage region;
   the power storage unit, the switch driving unit, the emergency power source and the emergency control unit are provided in a higher voltage region which is electrically insulated from the lower voltage region;
   the control circuit further comprises an insulated power source provided in the lower voltage region and the higher voltage region to be positioned across a boundary portion therebetween, the insulated power source being supplied with power from the low voltage power source to supply power to the switch driving unit;
   the abnormality determination unit stops the insulated power source when determined that a failure occurs in the lower voltage region in the control circuit;
   the emergency control unit detects an output voltage of the insulated power source and performs the short circuit control after the detected output voltage starts to decrease using an emergency power generated by the emergency power source;
   the control circuit further comprises a first power source circuit that generates power supplied to the switch command generation unit, the first power source circuit being supplied with power from the low voltage power source, and a second power source unit that generates power supplied to the abnormality determination unit, the second power source unit being supplied with power from the low voltage power source;
   the switch command generation unit is configured to be capable of operating with power being supplied from the first power source circuit; and
   the abnormality determination unit is configured to be capable of operating with power being supplied from the second power source circuit.

3. A control circuit of a power converter for a system provided with a power storage unit, a multiphase rotating electric machine, a power converter having upper arm switches and lower arm switches electrically connected to respective phases of the rotating electric machine and a low voltage power source, the control circuit comprising:
   a switch command generation unit that generates a switching command for performing a drive control of the rotating electric machine;

a switch driving unit that drives the upper and lower arm switches based on the switching command, the switch driving unit being capable of operating with power supplied thereto;

an emergency power source that generates an emergency power, the emergency power source being supplied with power from the power storage unit;

an abnormality determination unit that determines whether a failure occurs in the control circuit; and an emergency control unit that performs, when the emergency determination unit determines that a failure occurs in the control circuit, a short circuit control in which either the upper arm switches or the lower arm switches are turned ON and the other arm switches are turned OFF by using the emergency power generated by the emergency power source, wherein the switch command generation unit, the abnormality determination unit and the low voltage power source are provided in a lower voltage region;

the power storage unit, the switch driving unit, the emergency power source and the emergency control unit are provided in a higher voltage region which is electrically insulated from the lower voltage region;

the control circuit further comprises an insulated power source provided in the lower voltage region and the higher voltage region to be positioned across a boundary portion therebetween, the insulated power source being supplied with power from the low voltage power source to supply power to the switch driving unit;

the abnormality determination unit stops the insulated power source when determined that a failure occurs in the lower voltage region in the control circuit;

the emergency control unit detects an output voltage of the insulated power source and performs the short circuit control after the detected output voltage starts to decrease using an emergency power generated by the emergency power source;

the control circuit further comprises a third power source circuit that generates power supplied to the switch command generation unit, the third power source circuit being supplied with power from the low voltage power source, and a supervisory unit provided in the low voltage region supervising whether a failure occurs on the switch command generation unit, the supervisory unit being configured to be capable of operating with power supplied from a supervisory power source different from the third power source circuit, a power supply source for the supervisory power being the low voltage power source; and the abnormality determination unit stops the insulated power source when the supervisory unit determines that a failure occurs on the switch command generation unit.

4. The control circuit of the power converter according to claim 3, wherein the supervisory unit firstly determines whether a failure occurs on the switch command generation unit, and the insulated power source is activated when a determination result of the supervisory unit is that no failure occurs on the switch command unit.

5. The control circuit of the power converter according to claim 3, wherein the supervisory unit firstly determines whether a failure occurs on the switch command generation unit, a stopping function by the abnormality determination unit to stop the insulated power source is enabled when a determination result of the supervisory unit is that no failure occurs on the switch command unit.

6. The control circuit of the power converter according to claim 1, wherein the switch command generation unit has a function for determining whether a failure occurs on itself, and outputs, when determined that a failure occurs on itself, information indicating occurrence of failure to the abnormality determination unit; and the abnormality determination unit, when accepting the information indicating occurrence of failure, stops the insulated power source.

7. The control circuit of the power converter according to claim 1, wherein the switch driving unit includes an upper arm driving unit that drives the upper arm switches and a lower arm driving unit that drives the lower arm switches;

the insulated power source generates power supplied to the upper arm driving unit and the lower arm driving unit;

switches turned ON by the short-circuit control in the upper arm switches and the lower arm switches are defined as an ON side switch and switches turned OFF by the short-circuit control in the upper arm switches and the lower arm switches are defined as an OFF side switch;

the emergency control unit commands a driving unit of which a driving object is the ON side switch in the upper arm driving unit and the lower arm driving unit to execute the short-circuit control, when a voltage from the insulated power source supplied to a driving unit of which a driving object is the OFF side switch in the upper arm driving unit and the lower arm driving unit is below a predetermined voltage.

8. The control circuit of the power converter according to claim 1, wherein switches turned OFF by the short-circuit control in the upper arm switches and the lower arm switched are defined as an OFF side switch;

the control circuit further comprises an enforced OFF unit that forcibly changes the switching command for the OFF side switch transmitted to the switch driving unit to be OFF command, when the emergency control unit performs the short-circuit control.

9. The control circuit of the power converter according to claim 1, wherein the emergency control unit commands the switch driving unit to execute the short-circuit control while supplying the emergency power generated by the emergency power source to the switch driving unit.

* * * * *